(12) United States Patent
Letai et al.

(10) Patent No.: US 12,529,692 B2
(45) Date of Patent: Jan. 20, 2026

(54) LIVE CELL IMAGING DYNAMIC BH3 PROFILING

(71) Applicant: Dana-Farber Cancer Institute, Inc., Boston, MA (US)

(72) Inventors: Anthony Letai, Medfield, MA (US); Patrick Bhola, Cambridge, MA (US); Rebecca German, Sandwich, MA (US)

(73) Assignee: DANA-FARBER CANCER INSTITUTE, INC., Boston, MA (US)

( * ) Notice: Subject to any disclaimer, the term of this patent is extended or adjusted under 35 U.S.C. 154(b) by 1183 days.

(21) Appl. No.: 17/433,970

(22) PCT Filed: Feb. 26, 2020

(86) PCT No.: PCT/US2020/019999
§ 371 (c)(1),
(2) Date: Aug. 25, 2021

(87) PCT Pub. No.: WO2020/176689
PCT Pub. Date: Sep. 3, 2020

(65) Prior Publication Data
US 2022/0163510 A1 May 26, 2022

Related U.S. Application Data

(60) Provisional application No. 62/810,928, filed on Feb. 26, 2019.

(51) Int. Cl.
| | | |
|---|---|---|
| G01N 33/50 | (2006.01) | |
| G01N 33/574 | (2006.01) | |
| G01N 33/58 | (2006.01) | |
| G02B 21/36 | (2006.01) | |

(52) U.S. Cl.
CPC ....... *G01N 33/5011* (2013.01); *G01N 33/574* (2013.01); *G01N 33/583* (2013.01); *G02B 21/365* (2013.01)

(58) Field of Classification Search
CPC ............. G01N 33/5011; G01N 33/574; G01N 33/583; G01N 33/5079; G01N 2800/7028; G02B 21/365
See application file for complete search history.

(56) References Cited

U.S. PATENT DOCUMENTS

| | | |
|---|---|---|
| 4,522,811 A | 6/1985 | Eppstein et al. |
| 4,676,980 A | 6/1987 | Segal et al. |
| 4,816,567 A | 3/1989 | Cabilly et al. |
| 4,946,778 A | 8/1990 | Ladner et al. |
| 5,225,539 A | 7/1993 | Winter |
| 5,545,806 A | 8/1996 | Lonberg et al. |
| 5,545,807 A | 8/1996 | Surani et al. |
| 5,569,825 A | 10/1996 | Lonberg et al. |
| 5,625,126 A | 4/1997 | Lonberg et al. |
| 5,633,425 A | 5/1997 | Lonberg et al. |
| 5,661,016 A | 8/1997 | Lonberg et al. |
| 5,674,980 A | 10/1997 | Frankel et al. |
| 5,804,604 A | 9/1998 | Frankel et al. |
| 5,916,771 A | 6/1999 | Hori et al. |
| 5,939,598 A | 8/1999 | Kucherlapati et al. |
| 5,965,703 A | 10/1999 | Horne et al. |
| 7,064,193 B1 | 6/2006 | Cory et al. |
| 7,714,005 B2 | 5/2010 | Chen et al. |
| 7,868,133 B2 | 1/2011 | Korsmeyer et al. |
| 8,221,966 B2 | 7/2012 | Letai |
| 8,466,140 B2 | 6/2013 | Altieri et al. |
| 9,360,473 B2 | 6/2016 | Cardone |
| 9,540,674 B2 | 1/2017 | Letai |
| 9,856,303 B2 | 1/2018 | Korsmeyer et al. |
| 9,902,759 B2 | 2/2018 | Korsmeyer et al. |
| 10,393,733 B2 | 8/2019 | Letai et al. |
| 10,739,333 B2 | 8/2020 | Ryan et al. |
| 10,761,086 B2 | 9/2020 | Letai et al. |
| 11,215,608 B2 | 1/2022 | Letai et al. |
| 11,225,511 B2 | 1/2022 | Letai et al. |
| 2002/0115613 A1 | 8/2002 | Kumar |
| 2004/0171809 A1 | 9/2004 | Korsmeyer et al. |
| 2007/0027175 A1 | 2/2007 | Shaughnessy et al. |
| 2008/0199890 A1 | 8/2008 | Letai |
| 2008/0234201 A1 | 9/2008 | Korsmeyer et al. |
| 2010/0286057 A1 | 11/2010 | Walensky et al. |
| 2011/0130309 A1 | 6/2011 | Cardone |

(Continued)

FOREIGN PATENT DOCUMENTS

| | | |
|---|---|---|
| JP | H10-510059 A | 9/1998 |
| JP | 2005-130867 A | 5/2005 |

(Continued)

OTHER PUBLICATIONS

Buron et al., PLOS One, vol. 5, Issue 3, e9924, Mar. 31, 2020.*
Nonnenmacher et al., Metabolic Engineering, 43:147-155, (Year: 2017).*
Porporato et al., Cell Research 28:265-280 (Year: 2018).*
Supplementary Partial European Search Report for EP03749602.3 mailed Jun. 7, 2006.
Supplementary European Search Report for EP03749602.3 mailed Sep. 28, 2006.
International Search Report for PCT/US2003/028482 mailed Dec. 8, 2005.

(Continued)

*Primary Examiner* — Kimberly Ballard
*Assistant Examiner* — Stacey N MacFarlane
(74) *Attorney, Agent, or Firm* — Mueting Raasch Group

(57) ABSTRACT

Aspects of the application provide methods and compositions for identifying and evaluating putative therapeutic agents for cancer by live cell imaging. Cell samples comprising cancerous cells that have been pre-treated with a test agent are contacted with a BH3 peptide, and samples are imaged by live cell imaging over a time interval. Methods of the application can be used to determine whether a patient is likely to benefit from treatment with a particular test agent.

20 Claims, 15 Drawing Sheets
Specification includes a Sequence Listing.

(56) References Cited

U.S. PATENT DOCUMENTS

| | | | |
|---|---|---|---|
| 2011/0154522 | A1 | 6/2011 | Korsmeyer et al. |
| 2013/0122492 | A1 | 5/2013 | Khosravi et al. |
| 2013/0149718 | A1 | 6/2013 | Letai |
| 2015/0362479 | A1* | 12/2015 | Letai ................. G01N 33/5743 435/29 |
| 2016/0178612 | A1 | 6/2016 | Cardone |
| 2016/0200786 | A1 | 7/2016 | Korsmeyer et al. |
| 2016/0231314 | A1 | 8/2016 | Ryan et al. |
| 2016/0258933 | A1 | 9/2016 | Letai |
| 2017/0160267 | A9 | 6/2017 | Letai |
| 2017/0184567 | A1 | 6/2017 | Letai |
| 2018/0120297 | A1 | 5/2018 | Letai et al. |
| 2018/0128813 | A1 | 5/2018 | Letai et al. |
| 2018/0244740 | A1 | 8/2018 | Korsmeyer et al. |
| 2018/0306796 | A1 | 10/2018 | Tsvetkov et al. |
| 2020/0096499 | A1 | 3/2020 | Letai et al. |
| 2021/0018493 | A1 | 1/2021 | Letai et al. |
| 2021/0041419 | A1 | 2/2021 | Letai et al. |
| 2021/0255167 | A1 | 8/2021 | Letai et al. |

FOREIGN PATENT DOCUMENTS

| | | | |
|---|---|---|---|
| JP | 2005-518393 A | 6/2005 | |
| JP | 2006-520606 A | 9/2006 | |
| JP | 2009-532033 A | 9/2009 | |
| JP | 2009-240173 A | 10/2009 | |
| JP | 2009-542195 A | 12/2009 | |
| JP | 2009-543044 A | 12/2009 | |
| JP | 2011-501731 A | 1/2011 | |
| JP | 2012-529890 A | 11/2012 | |
| JP | 2014-81365 A | 5/2014 | |
| JP | 6663852 B | 2/2020 | |
| WO | WO 91/00360 A1 | 1/1991 | |
| WO | WO 92/20373 A1 | 11/1992 | |
| WO | WO 93/08829 A1 | 5/1993 | |
| WO | WO 94/02602 A1 | 2/1994 | |
| WO | WO 94/11026 A2 | 5/1994 | |
| WO | WO 96/27011 A1 | 9/1996 | |
| WO | WO 96/33735 A1 | 10/1996 | |
| WO | WO 96/34096 A1 | 10/1996 | |
| WO | WO 97/05265 A1 | 2/1997 | |
| WO | WO 99/53049 A1 | 10/1999 | |
| WO | WO 00/59526 A1 | 10/2000 | |
| WO | WO 01/12661 A2 | 2/2001 | |
| WO | WO 02/20568 A2 | 3/2002 | |
| WO | WO 03/040168 A2 | 5/2003 | |
| WO | WO 2004/022580 A2 | 3/2004 | |
| WO | WO 2004/058804 A1 | 7/2004 | |
| WO | WO 2005/044839 A2 | 5/2005 | |
| WO | WO 2006/099667 A1 | 9/2006 | |
| WO | WO 2007/123791 A2 | 11/2007 | |
| WO | WO 2007/149270 A2 | 12/2007 | |
| WO | WO 2008/021484 A2 | 2/2008 | |
| WO | WO 2010/147961 A1 | 12/2010 | |
| WO | WO 2013/170176 A2 | 11/2013 | |
| WO | WO 2013/188978 A1 | 12/2013 | |
| WO | WO 2014/047342 A1 | 3/2014 | |
| WO | WO 2015/010094 A1 | 1/2015 | |
| WO | WO 2015/042249 A1 | 3/2015 | |
| WO | WO 2016/176299 A1 | 11/2016 | |
| WO | WO-2016176288 A1 * | 11/2016 | ......... G01N 33/5044 |

OTHER PUBLICATIONS

International Search Report and Written Opinion for PCT/US2007/008055 mailed Jan. 2, 2008.
International Preliminary Report on Patentability for PCT/U2007/008055 mailed Sep. 30, 2008.
International Search Report and Written Opinion for PCT/US2013/060707 mailed Jan. 9, 2014.
International Preliminary Report on Patentability for PCT/US2013/060707 mailed Apr. 2, 2015.
Extended European Search Report for EP14845952.2 mailed Mar. 27, 2017.
International Search Report and Written Opinion for PCT/US2014/056284 mailed Dec. 31, 2014.
International Preliminary Report on Patentability for PCT/US2014/056284 mailed Mar. 31, 2016.
Extended European Search Report for EP16787039.3 mailed Oct. 4, 2018.
International Search Report and Written Opinion for PCT/US2016/029495 mailed Aug. 5, 2016.
International Preliminary Report on Patentability for PCT/US2016/029495 mailed Nov. 9, 2017.
Extended European Search Report for EP16787045.0 mailed Oct. 4, 2018.
International Search Report and Written Opinion for PCT/US2016/029510 mailed Aug. 12, 2016.
International Preliminary Report on Patentability for PCT/US2016/029510 mailed Nov. 9, 2017.
International Search Report and Written Opinion for PCT/US2020/019999 mailed Aug. 4, 2020.
International Preliminary Report on Patentability for PCT/US2020/019999 mailed Sep. 10, 2021.
Adams, et al., The Bcl-2 Protein Family: Arbiters of Cell Survival. Science. 1998;281(5381):1322-1326.
Ait-Ikhlef et al. The motoneuron degeneration in the wobbler mouse is independent of the overexpression of a Bcl2 transgene in neurons. Neurosci. Lett. 1995;199:163-6.
Akgul et al., In vivo localisation and stability of human Mcl-1 using green fluorescent protein (GFP) fusion proteins. FEBS Lett. Jul. 28, 2000;478(1-2):72-6.
Bae et al., Underphosphorylated BAD interacts with diverse antiapoptotic Bcl-2 family proteins to regulate apoptosis. Apoptosis. 2001;6:319-30.
Barretina et al., The Cancer Cell Line Encyclopedia enables predictive modelling of anticancer drug sensitivity. Nature. Mar. 28, 2012;483(7391):603-7. doi: 10.1038/nature11003. Erratum in: Nature. Dec. 13, 2012;492(7428):290.
Bhola et al., Functionally identifiable apoptosis-insensitive subpopulations determine chemoresistance in acute myeloid leukemia. J Clin Invest. Oct. 3, 2016;126(10):3827-3836. doi: 10.1172/JCI82908. Epub Sep. 6, 2016. PMID: 27599292; PMCID: PMC5096802.
Bouillet et al., Proapoptotic Bcl-2 Relative Bim Required for Certain Apoptotic Responses, Leukocyte Homeostatis, and to Preclude Autoimmunity. Science. 1999;286:1735-8.
Boyd et al., Bik, a novel death-inducing protein shares a distinct sequence motif with Bcl-2 family proteins and interacts with viral and cellular survival-promoting proteins. Oncogene. 1995;11:1921-8.
Brady et al., Reflections on a peptide. Nature. 1994;368:692-3.
Brennan et al., Preparation of Bispecific Antibodies by Chemical Recombination of Monoclonal Immunoglobulin G1 Fragments. Science. 1985;229:81.
Buron et al., Use of human cancer cell lines mitochondria to explore the mechanisms of BH3 peptides and ABT-737-induced mitochondrial membrane permeabilization. PLoS One. Mar. 31, 2010;5(3):e9924. doi: 10.1371/journal.pone.0009924.
Calin et al., A MicroRNA Signature Associated with Prognosis and Progression in Chronic Lymphocytic Leukemia. N. Engl. J. Med. 2005;353:1793-801.
Campos et al., Method for monitoring of mitochondrial cytochrome c release during cell death: Immunodetection of cytochrome c by flow cytometry after selective permeabilization of the plasma membrane. Cytometry Part A. Jun. 2006;69(6):515-23.
Caron et al., Engineered Humanized Dimeric Forms of IgG are More Effective Antibiotics. J. Exp. Med. 1992; 176:1191-5.
Cartron et al., The first α Helix of Bax Plays a Necessary Role in Its Ligand-Induced Activation by the BH3-Only Proteins Bid and PUMA. Mol. Cell 2004; 16:807-18.
Certo et al., Mitochondria Primed by Death Signals Determine Cellular Addiction to Antiapoptotic BCL-2 Family Members. Cancer Cell. May 2006;9:351-65.
Chen et al., Caspase cleavage of $Bim_{EL}$ triggers a positive feedback amplification of apoptotic signaling. Proc. Natl. Acad. Sci. USA. 2004;101(5):1235-40.

(56) References Cited

OTHER PUBLICATIONS

Chen et al., Differential Targeting of Prosurvival Bcl-2 Proteins by Their BH3-Only Ligands Allows Complementary Apoptotic Function. Mol. Cell. 2005;17:393-403.

Cheng et al., Bax-independent inhibition of apoptosis by Bcl-$X_L$. Nature. 1996;379:554-6. Abstract.

Cheng et al., BCL-2, BCL-$X_L$ Sequester BH3 Domain-Only Molecules Preventing BAX- and BAK-Mediated Mitochondrial Apoptosis. Mol. Cell. 2001;8:705-11.

Chipuk et al., Direct Activation of Bax by p53 Mediates Mitochondrial Membrane Permeabilization and Apoptosis. Science. 2004;303:1010-4. Abstract.

Chittenden et al., A conserved domain in Bak, distinct from BH1 and BH2, mediates cell death and protein binding functions. EMBO J. 1995;14(22):5589-96.

Chittenden et al., Induction of apoptosis by the Bcl-2 homologue Bak. Nature. 1995;374(6524):733-6. Abstract.

Chonghaile et al., Pretreatment mitochondrial priming correlates with clinical response to cytotoxic chemotherapy. Science. Nov. 25, 2011;334(6059):1129-33. doi:10.1126/science.1206727. Epub Oct. 27, 2011.

Cole et al., The EBV-Hybridoma technique and its application to human lung cancer. Monoclonal Antibodies and Cancer Therapy. 1985;77-96.

Cory et al., The Bcl2 Family: Regulators of the Cellular Life-or-Death Switch. Nat. Rev. Cancer. 2002;2(9):647-56. Abstract.

Cosulich et al., Regulation of apoptosis by BH3 domains in a cell-free system. Curr. Biol. 1997;7(12):913-20.

Cote et al., Generation of human monoclonal antibiotics reactive with cellular antigens. Proc. Natl. Acad. Sci. USA. 1983;80:2026-30.

Czabotar et al., Bax Activation by Bim? Cell Death and Differentiation. Sep. 2009;16:1187-91.

Davids et al., BH3 profiling demonstrates that restoration of apoptotic priming contributes to increased sensitivity to PI3K inhibition in stroma-exposed chronic lymphocytic leukemia cells. Blood 118(21);974. Nov. 18, 2011. Abstract.

Davids et al., Targeting the B-cell lymphoma/leukemia 2 family in cancer. J Clin Oncol. Sep. 1, 2012;30(25):3127-35. doi: 10.1200/JCO.2011.37.0981. Epub May 29, 2012.

Degrado, Designs of peptides and proteins. Adv Protein Chem. 1988;39:51-124.

Del Gaizo Moore et al., BH3 profiling—measuring integrated function of the mitochondrial apoptotic pathway to predict cell fate decisions. Cancer Lett. May 28, 2013;332(2):202-5. doi: 10.1016/j.canlet.2011.12.021. Epub Jan. 8, 2012.

Deng et al., BH3 Profiling Identifies Three Distinct Classes of Apoptotic Blocks to Predict Response to ABT-737 and Conventional Chemotherapeutic Agents. Cancer Cell. Aug. 2007;12:171-85.

Derenne et al., Antisense strategy shows that Mcl-1 rather than Bcl-2 or Bcl-xL is an essential survival protein of human myeloma cells. Blood. 2002;100:194-9.

Desagher et al., Bid-induced Conformational Change of Bax is Responsible for Mitochondrial Cytochrome c Release during Apoptosis. J. Cell Biol. 1999;144(5):891-901.

Di Lisa et al., Mitochondrial Function and Cell Injury in Single Cardiac Myocytes Exposed to Anoxia and Reoxygenation. Transplant Proc. 1995;27(5):2829-30.

Di Lisa et al., Mitochondrial membrane potential in single living adult rat cardiac myocytes exposed to anoxia or metabolic inhibition. J. Physiol. 1995;486(1):1-13.

Dohner et al., Genomic Aberrations and Survival in Chronic Lymphocytic Leukemia. N. Engl. J. Med. 2000;343:1910-16.

Egle et al., Bim is a suppressor of Myc-induced mouse B cell leukemia. Proc. Natl. Acad. Sci. USA. 2004;101(16):6164-9.

Ellerby, et al., Anti-cancer activity of targeted pro-apoptotic peptides. Nat. Med. 1999;5(9):1032-8.

Elliott et al., Intercellular Trafficking and Protein Delivery by a Herpesvirus Structural Protein. Cell. 1997;88:223-33.

Emerman et al., Effects of defined medium, fetal bovine serum, and human serum on growth and chemosensitivities of human breast cancer cells in primary culture: inference for in vitro assays. In Vitro Cell Dev Biol. Feb. 1987;23(2):134-40.

Eskes et al., Bid Induces the Oligomerization and Insertion of Bax into the Outer Mitochondrial Membrane. Mol. Cell. Biol. 2000;20(3):929-35.

Fanidi et al., Cooperative interaction between c-myc and bcl-2 proto-oncogenes. Nature. 1992;359:554-6.

Fishwild et al., High-avidity human IgGk monoclonal antibodies from a novel strain of minilocus transgenic mice. Nature Biotechnology. 1996;14:845-51.

Foight et al., Designed BH3 peptides with high affinity and specificity for targeting Mcl-1 in cells. ACS Chem Biol. Sep. 19, 2014;9(9):1962-8. doi: 10.1021/cb500340w. Epub Jul. 23, 2014.

Frankel et al., Activity of synthetic peptides from the Tat protein of human immunodeficiency virus type 1. Proc. Natl. Acad. Sci. USA. 1989;86:7397-401.

Friedman et al., Precision medicine for cancer with next-generation functional diagnostics. Nat Rev Cancer. Dec. 2015; 15(12):747-56. doi: 10.1038/nrc4015. Epub Nov. 5, 2015.

Fuchs et al., Pathway for Polyarginine Entry into Mammalian Cells. Biochemistry Mar. 2004;43(9):2438-44.

Futaki et al., Arginine-rich Peptides: An Abundant Source of Membrane-Permeable Peptides Having Potential as Carriers for Intracellular Protein Delivery. J. Biol. Chem. 2001;276(8):5836-40.

Green et al., A matter of life and death. Cancer Cell. 2002;1:19-30.

Green et al., The Pathophysiology of Mitochondrial Cell Death. Science. 2004;305:626-9.

Green, Life, Death, BH3 Profiles, and the Salmon Mousse. Cancer Cell. Aug. 2007;12:97-9.

Griffiths et al., Cell Damage-induced Conformational Changes of the Pro-Apoptotic Protein Bak In Vivo Precede the Onset of Apoptosis. J. Cell Biol. 1999;144(5):903-14.

Gross et al., Enforced dimerization of BAX results in its translocation, mitochondrial dysfunction and apoptosis. EMBO J. 1998;17(14):3878-85.

Grosschedl et al., Introduction of a μ immunoglobulin gene into the mouse germ line: specific expression in lymphoid cells and synthesis of functional antibody. Cell. 1984;38:647-58.

Gruber et al., Efficient Tumor Cell Lysis Mediated by a Bispecific Single Chain Antibody Expressed in *Escherichia coli*. J. Immunol. 1994;152:5368-74.

Gul et al., Apoptotic blocks and chemotherapy resistance: strategies to identify Bcl-2 protein signatures. Briefings in Functional Genomics and Proteomics. Jan. 2008;7(1):27-34.

Hanahan et al., Heritable formation of pancreatic β-cell tumors in transgenic mice expressing recombinant insulin/simian virus 40 oncogenes. Nature. 1985;315:115-22.

Hanahan et al., The Hallmarks of Cancer. Cell. 2000;100:57-70.

Hans et al., Beta-carbolines induce apoptosis in cultured cerebellar granule neurons via the mitochondrial pathway. Neuropharmacology. Jan. 2005;48(1):105-17.

Harada et al., Survival factor-induced extracellular signal-regulated kinase phosphorylates BIM, inhibiting its association with BAX and proapoptotic activity. Proc. Natl. Acad. Sci. USA. 2004;101(43):15313-7.

Hemann et al., Evasion of the p53 tumour surveillance network by tumour-derived MYC mutants. Nature. 2005;436:807-11.

Hemann et al., Suppression of tumorigenesis by the p53 target PUMA. Proc. Natl. Acad. Sci. USA. 2004;101(25):9333-8.

Hengartner et al., C. elegans Cell Survival Gene ced-9 Encodes a functional Homolog of the Mammalian Proto-Oncogene bcl-2. Cell. 1994;76:665-76.

Hermine et al. Prognostic significance of bcl-2 protein expression in aggressive non-Hodgkin's lymphoma. Groupe d'Etude des Lymphomes de l'Adulte (GELA). Blood. 1996;87(1):265-272.

Holinger et al., Bak BH3 Peptides Antagonize Bcl-x. L Function and Induce Apoptosis through Cytochrome c-independent Activation of Caspases. J. Biol. Chem. 1999;274(19):13298-304.

Holliger et al., Diabodies: Small bivalent and bispecific antibody fragments. Proc. Natl. Acad. Sci. USA. 1993;90:6444-8.

(56) References Cited

OTHER PUBLICATIONS

Hoogenboom et al., By-passing Immunisation, Human Antibodies from Synthetic Repertoires of Germline VH Gene segments rearranged in Vitro. J. Mol. Biol. 1992;227:381-8.
Hopp et al., Prediction of protein antigenic determinants from amino acid sequences. Proc. Natl. Acad. Sci. USA. 1981;78:3824-8.
Hsu et al., Nonionic Detergents Induce Dimerization among Members of the Bcl-2 Family. J. Biol. Chem. 1997;272(21):13829-34.
Huang et al., BH3-Only Proteins—Essential Initiators of Apoptotic Cell Death. Cell. 2000; 103:839-42.
Huse et al., Generation of a large Combinatorial Library of the Immunoglobulin Repertoire in Phage Lambda. Science. 1989;246:1275-81.
Inohara et al., Harakiri, a novel regulator of cell death, encodes a protein that activates apoptosis and interacts selectively with survival-promoting proteins Bcl-2 and Bcl-XL. Embo J. 1997;16(7):1686-94.
Jackson et al., Heat shock induces the release of fibroblast growth factor 1 from Nih 3T3 cells. Proc. Natl. Acad. Sci. USA. 1992;89:10691-5.
Jameson et al., A rationally designed CD4 analogue inhibits experimental allergic encephalomyelitis. Nature. 1994;368:744-6.
Jones et al., Replacing the complementarily-determining regions in a human antibody with those from a mouse. Nature. 1986;321:522-5.
Jonkers et al., Oncogene addiction: Sometimes a temporary slavery. Cancer Cell. 2004;6:535-8.
Kelekar et al., Bad is a BH3 Domain-Containing Protein that Forms an Inactivating Dimer with Bcl-$X_L$. Mol. Cell Biol. 1997;17(12):7040-6.
Kelekar et al., Bcl-2-family proteins: the role of the BH3 domain in apoptosis. Trends Cell Biol. 1998;8:324-30.
Kohler et al., Continuous cultures of fused cells secreting anti-body of predefined specificity. Nature. 1975;256:495-7.
Korsmeyer et al., Pro-apoptotic cascade activates BID, which oligomerizes BAK or BAX into pores that result in the release of cytochrome c. Cell Death Differ. Dec. 2000;7(12):1166-73.
Kostelny et al., Formation of a Bispecific antibody by the Leucine Zippers. J. Immunol. 1992;148(5):1547-53.
Kozbor et al., The production of monoclonal antibodies from human lymphocytes. Immunol Today. 1983;4:72-9.
Kozbor, A human hybrid Myeloma for production of human monoclonal antibodies. J. Immunol. 1984;133:3001-5.
Krieg, Mechanisms and applications of immune stimulatory CpG oligodeoxynucleotides. Biochim Biophys Acta. 1999;1489(1):107-16.
Kuwana et al., BH3 Domains of BH3-Only Proteins Differentially Regulate Bax-Mediated Mitochondrial Membrane Permeabilization Both Directly and Indirectly. Mol. Cell. 2005;17:525-35.
Kuwana et al., Bid, Bax, and Lipids Cooperate to Form Supramolecular Openings in the Outer Mitochondrial Membrane. Cell. 2002;111:331-42.
Kyte et al., A Simple Method for displaying the Hydropathic Character of a protein. J. Mol. Biol. 1982;157:105-42.
La Vieira, et al., Cell permeable BH3-peptides overcome the cytoprotective effect of Bcl-2 and Bcl-XL. Oncogene. 2002;21(13):1963-77.
Leo et al., Characterization of the Antiapoptotic Bcl-2 Family Member Myeloid Cell Leukemia-1 (Mcl-1) and the Stimulation of Its Message by Gonadotropins in the Rat Ovary. Endocrinol. 1999;140(12):5469-77.
Letai et al., Antiapoptotic BCL-2 is required for maintenance of a model leukemia. Cancer Cell. 2004;6:241-9.
Letai et al., Distinct BH3 domains either sensitize or activate mitochondrial apoptosis, serving as prototype cancer therapeutics. Cancer Cell. Sep. 2002;2(3):183-92.
Letai, BH3 domains as BCL-2 inhibitors: prototype cancer therapeutics. Expert Opin Biol Ther. Apr. 2003;3(2):293-304.
Letai, Perturbing cancer cell mitochondria to learn how to kill cancer with BH3 profiling. Broad Institute, Seminar Series on Cell Circuits and Epigenomics. Jul. 28, 2014 Presentation.
Letai, The BCL-2 network: Mechanistic insights and therapeutic potential. Drug Disc. Today: Disease Mechanisms. 2005;2(2):145-51.
Li et al., Cleavage of BID by Caspase 8 Mediates the Mitochondrial Damage in the Fas Pathway of Apoptosis. Cell. 1998;94(4):491-501.
Li et al., Endonuclease G is an apoptotic DNase when released from mitochondria. Nature. 2001;412:95-9.
Li et al., tsg 101: A novel tumor susceptibility gene isolated by controlled Homozygous functional knockout of Allelic Loci in Mammalian Cells. Cell. 1996;85:319-29.
Lieber et al., Apoptosis sensitizers enhance cytotoxicity in hepatoblastoma cells. Pediatr Surg Int. Feb. 2012;28(2):149-59. doi: 10.1007/s00383-011-2988-z.
Liu et al., Bax conformational change is a crucial step for PUMA-mediated apoptosis in human leukemia. Biochem Biophys Res Commun. 2003;310(3):956-62.
Lonberg et al., Antigen-specific human antibodies from mice comprising four distinct genetic modifications. Nature. 1994;368:856-9.
Lonberg et al., Human Antibodies from Transgenic Mice. Intern Rev Immunol. 1995;13:65-93.
Long et al., Optimization and validation of mitochondria-based functional assay as a useful tool to identify BH3-like molecules selectively targeting anti-apoptotic Bcl-2 proteins. BMC Biotechnol. May 24, 2013;13:45. doi: 10.1186/1472-6750-13-45.
Luo et al., Bid, a Bc12 interacting protein, mediates cytochrome c release from mitochondria in response to activation of cell surface death receptors, Cell. 1998;94(4):481-90.
Lutter et al., The pro-apoptotic Bcl-2 family member tBid localizes to mitochondrial contact sites. BMC Cell Biology. 2001;2:22.
Marani et al., Identification of Novel Isoforms of the BH3 Domain Protein Bim which Directly Activate Bax to Trigger Apoptosis. Mol Cell Biol. 2002;22(11):3577-89.
Marks et al., By-passing Immunization human Antibodies from v-gene libraries displayed on phage. J. Mol. Biol. 1991;222:581.
Marks et al., By-passing immunization: building high affinity human antibodies by chin shuffling. Bio/Technology. 1992;10:779-83.
Martin, Opening the Cellular Poison Cabinet. Science. Dec. 2010;330:1330-1.
Mason et al., The Hypogonadal mouse: reproductive functions restored by gene therapy. Science. 1986;234:1372-8.
Matsushita et al., A high-efficiency protein transduction system demonstrating the role of PKA in long-lasting long-term potentiation. J. Neuroscience. 2001;21(16):6000-7.
Matsuzaki, Why and how are peptide-lipid interactions utilized for self-defense? Biochem. Soc. Transactions. 2001;29:598-601.
McDonnell et al., bcl-2-Immunoglobulin Transgenic Mice Demonstrate Extended B Cell Survival and Follicular Lymphoproliferation. Cell. 1989;57:79-88.
Means et al., Modifications to change properties in Chemical Modification of Protein. 1974. Chapter 3, pp. 35-54, Holden-Day.
Milstein et al., Hybrid hybridomas and their use in immunohistochemistry. Nature. 1983;305:537-9.
Montero et al., Drug-induced death signaling strategy rapidly predicts cancer response to chemotherapy. Cell. Feb. 26, 2015;160(5):977-90. doi:10.1016/j.cell.2015.01.042.
Morrison et al., Success in specification. Nature. 1994;368:812-3.
Muchmore et al., X-ray and NMR structure of human Bcl-XL, an inhibitor of programmed cell death. Nature. 1996;381:335-41.
Munson et al., Ligand: A Versatile Computerized Approach for Characterization of Ligand-Binding Systems. Analytical Biochemistry. 1980;107:220-39.
Nakano et al., PUMA, a Novel Proapoptotic Gene, is Induced by p53. Mol. Cell. 2001;7:683-94.
Narita, et al., Bax interacts with the permeability transition pore to induce permeability transition and cytochrome c release in isolated mitochondria. Proc. Natl. Acad. Sci. USA. 1998;95:14681-6.
Neuberger et al., Generating high-avidity human Mabs in mice. Nature Biotechnology. 1996;14:826.

(56) References Cited

OTHER PUBLICATIONS

O'Brien et al., Phase I and II Multicenter Study of Oblimersen Sodium, a Bcl-2 Antisense Oligonucleotide, in Patients With Advanced Chronic Lymphocytic Leukemia. J. Clin. Oncol. 2005;23(30):7697-702.
O'Connor et al., Bim: a novel member of the Bcl-2 family that promotes apoptosis. Embo J. 1998;17(2):384-95.
Oda et al., Noxa, a BH3-Only Member of the Bcl-2 Family and Candidate Mediator of p53-Induced Apoptosis. Science. 2000;288:1053-8.
Oh et al., Conformational Changes in BID, a Pro-apoptotic BCL-2 Family Member, upon Membrane Binding. J. Biol. Chem. 2005;280(1):753-67.
Oliver et al., Permeabilization of Cell Membranes. C. Oliver and M.C. Jamur (eds.), Immunocytochemical Methods and Protocols, Methods in Molecular Biology, vol. 588, DOI 10.1007/978-1-59745-324-0_9, © Humana Press, a part of Springer Science + Business Media, LLC 1995, 1999, 2010. Chapter 9: 4 pages.
Oltersdorf et al., An inhibitor of Bcl-2 family proteins induces regression of solid tumours. Nature. 2005;435:677-81.
Opferman et al., Development and maintenance of B and T lymphocytes requires antiapoptotic MCL-1. Nature. 2003;426:671-6.
Pan et al., Selective BCL-2 inhibition by ABT-199 causes on-target cell death in acute myeloid leukemia. Cancer Discov. Mar. 2014;4(3):362-75. doi: 10.1158/2159-8290.CD-13-0609. Epub Dec. 17, 2013.
Pinkert et al., An albumin enhancer located 10 kb upstream functions along with its promoter to direct efficient, liver-specific expression in transgenic mice. Genes and Dev. 1987;1:268-276.
Polster et al., BH3 Death Domain Peptide Induces Cell Type-selective Mitochondrial Outer Membrane Permeability. J. Biol. Chem. 2001;276 (41):37887-94.
Presta, Antibody engineering. Curr. Op. Struct. Biol. 1992;2:593-6.
Putcha et al., Induction of BIM, a Proapoptotic BH3-Only BCL-2 Family Member, is Critical for Neuronal Apoptosis. Neuron. 2001;29(3):615-28.
Puthalakath et al., Bmf: a Proapoptotic BH3-Only Protein Regulated by Interaction with the Myosin V Actin Motor Complex, Activated by Anoikis. Science. 2001;293:1829-32.
Puthalakath et al., Keeping killers on a tight leash: transcriptional and post-translational control of the pro-apoptotic activity of BH3-only proteins. Cell Death Differ. 2002;9:505-12.
Puthalakath et al., The Proapoptotic Activity of the Bcl-2 Family Member Bim is Regulated by Interaction with the Dynein Motor Complex. Mol. Cell. 1999;3:287-96.
Quinsay et al., Pro-Apoptotic Bnip3 Mediates Permeabilization of Mitochondria and Release of Cytocrome c via a Novel Mechanism. Circulation. Oct. 28, 2008;118(18):S388. Abstract.
Raff, Social controls on cell survival and cell death. Nature. 1992;356:397-400.
Rassenti et al., ZAP-70 Compared with Immunoglobulin Heavy-Chain Gene Mutation Status as a predictor of Disease Progression in Chronic Lymphocytic Leukemia. N. Engl. J. Med. 2004;351:893-901.
Ray et al., BNIP3 Heterodimerizes with Bcl-2/Bcl-$X_L$ and Induces Cell Death Independent of a Bcl-2 Homology 3 (BH3) Domain at Both Mitochondrial and Nonmitochondrial Sites. J. Biol. Chem. 2000;275(2):1439-48.
Readhead et al., Expression of a myelin basic protein gene in transgenic shiverer mice: correction of the dysmyelinating phenotype. Cell. 1987;48:703-12.
Ren et al., BID, BIM, and PUMA are Essential for Activation of the BAX- and BAK-Dependent Cell Death Program. Science. Dec. 2010;330:1390-3.
Riechmann et al., Reshaping human antibodies for therapy. Nature. 1988;332:323-7.
Rizvi et al., Platelet-derived growth factor primes cancer-associated fibroblasts for apoptosis. J Biol Chem. Aug. 15, 2014;289(33):22835-49. doi:10.1074/jbc.M114.563064. Epub Jun. 27, 2014.
Rothbard et al., Conjugation of arginine oligomers to cyclosporine A facilitates topical delivery and inhibition of inflammation. Nature Med. 2000;6(11):1253-7.
Ryan et al., BH3 profiling in whole cells by fluorimeter or FACS. Methods. Jun. 1, 2013;61(2):156-64. doi: 10.1016/j.ymeth.2013.04.006. Epub Apr. 20, 2013.
Ryan et al., Heightened mitochondrial priming is the basis for apoptotic hypersensitivity of CD4+ CD8+ thymocytes. Proc Natl Acad Sci U S A. Jul. 20, 2010;107(29):12895-900. doi: 10.1073/pnas.0914878107. Epub Jul. 6, 2010.
Samson et al., A 35 amino acid fragment of leptin inhibits feeding in the rat. Endocrinology. 1996;137:5182-5.
Sattler et al., Structure of Bcl-XL-Bak Peptide Complex: Recognition Between Regulators of Apoptosis. Science. 1997;275:983-6.
Schimmer et al., The BH3 domain of BAD fused to the Antennapedia peptide induces apoptosis via its alpha helical structure and independent of Bcl-2. Cell Death Differ. Jul. 2001;8(7):725-33. doi: 10.1038/sj.cdd.4400870.
Schmitt et al., Genetic analysis of chemoresistance in primary murine lymphomas. Nat Med. 2000;6(9):1029-1035. doi: 10.1038/79542.
Sen et al., Artemisinin triggers induction of cell-cycle arrest and apoptosis in Leishmania donovani promastigotes. J Med Microbiol. Sep. 2007;56(Pt 9):1213-8.
Shalaby et al., Development of humanized bispecific antibodies reactive with cytotoxic lymphocytes and tumor cells overexpressing the HER2 protooncogene. Exp. Med. 1992;175:217-25.
Shangary et al., Peptides derived from BH3 domains of Bcl-2 family members: a comparative analysis of inhibition of Bcl-2, Bcl-x(L) and Bax oligomerization, induction of cytochrome c release, and activation of cell death. Biochemistry. Jul. 30, 2002;41(30):9485-95.
Shimizu et al., Proapoptotic BH3-only Bcl-2 family members induce cytochrome c release, but not mitochondrial membrane potential loss, and do not directly modulate voltage-dependent anion channel activity. Proc Natl Acad Sci U S A. Jan. 18, 2000;97(2):577-82.
Shopes, A genetically engineered human IgG mutant with enhanced cytolytic activity. J Immunol. 1992. 148:2918-2922.
Soltow et al., Overexpression of CuZnSOD or MnSOD protects satellite cells from doxorubicin-induced apoptosis. FASEB Journal. Apr. 2007;21:A449. Abstract.
Song et al., Carbon monoxide promotes Fas/CD95-induced apoptosis in Jurkat cells. J Biol Chem. Oct. 22, 2004;279(43):44327-34. Epub Jul. 27, 2004. Erratum in: J Biol Chem. Jun. 10, 2005;280(23):22555.
Stevenson et al., A chimeric antibody with dual Fc regions (bisFabFc) prepared by manipulations at the IgG hinge. Anti-Cancer Drug Design. 1989;3:219-30.
Strupp et al., Treatment of Cells with Detergent Activates Caspases and Induces Apoptotic Cell Death. J. Membrane Biology. Jun. 2000;175(3): 181-9.
Sugiyama et al., Activation of mitochondrial voltage-dependent anion channel by a pro-apoptotic BH3-only protein Bim. Oncogene. Jul. 25, 2002;21(32):4944-56.
Suresh et al., Bispecific Monoclonal Antibodies from Hybrid Hybridomas. Methods in Enzymology. 1986;121:210-28.
Suzuki et al., Possible Existence of Common Internalization Mechanisms among Arginine-rich Peptides. J. Biol. Chem. 2002;277:2437-43.
Terradillos et al. Direct addition of BimL to mitochondria does not lead to cytochrome c release. FEBS Lett. 2002;522(1-3):29-34.
Traunecker et al., Bispecific single chain molecules (Janusins) target cytotoxic lymphocytes on HIV infected cells. EMBO J. 1991;10:3655-9.
Tutt et al., Trispecific F(ab')3 derivatives that use cooperative signaling via the TCR/CD3 complex and CD2 to activate and redirect resting cytotoxic T cells. J. Immunol. 1991;147:60.
Vaquero et al., Extracellular matrix proteins protect pancreatic cancer cells from death via mitochondrial and nonmitochondrial pathways. Gastroenterology. Oct. 2003;125(4):1188-202.

(56) References Cited

OTHER PUBLICATIONS

Vaux et al., Bcl-2 gene promotes haemopoietic cell survival and cooperates with c-myc to immortalize pre-B cells. Nature. 1988;335(6189):440-42.
Verhoeyen et al., Reshaping Human Antibodies: Grafting an Antilysozyme Activity. Science. 1988;239:1534-6.
Vieira et al., Cell permeable BH3-peptides overcome the cytoprotective effect of Bcl-2 and Bcl-XL. Oncogene. 2002 21:1963-77.
Vitetta et al., Redesigning Nature's Poisons to Create Anti-Tumor Reagents. Science. 1987;238:1098-104.
Vives et al., A Truncated HIV-1 Tat Protein Basic Domain Rapidly Translocates through the Plasma Membrane and Accumulates in the Cell Nucleus. J. Biol. Chem. 1997;272(25):16010-7.
Vo et al., Relative mitochondrial priming of myeloblasts and normal HSCs determines chemotherapeutic success in AML. Cell. Oct. 12, 2012;151(2):344-55.
Wang et al., Bid: A Novel BH3 Domain-Only Death Agonist. Genes Dev. 1996;10(22):2859-69.
Wang et al., Cell Permeable Bcl-2 binding Peptides: A Chemical Approach to Apoptosis Induction in Tumor Cells. Cancer Res. 2000;60:1498-502.
Wang et al., Structure based discovery of an organic compound that binds Bcl-2 protein and induces apoptosis of tumor cells. PNAS. 2000;97:7124-9.
Wang, The Expanding Role of Mitochondria in Apoptosis. Genes Dev. 2001; 15:2922-33.
Wei et al., Proapoptotic BAX and BAK: A Requisite Gateway to Mitochondrial Dysfunction and Death. Science. 2001;292(5517):727-30.
Wei et al., tBID, a membrane-targeted death ligand, oligomerizes BAK to release cytochrome c. Genes & Development. 2000;14:2060-71.
Weinstein, Addiction to Oncogenes—the Achilles Heal of Cancer. Science. 2002;297:63-4.
Werner et al., Bcl-2 Family Member Bfl-1/A1 Sequesters Truncated Bid to Inhibit its Collaboration With Pro-Apoptotic Bak or Bax. J. Biol. Chem. 2002;277(25):22781-8.
Westerhoff et al., Magainins and the disruption of membrane-linked free-energy transduction. Proc. Natl. Acad. Sci. USA. Sep. 1989;86(17):6597-601.
Wilkinson, Immunochemical techniques inspire development of new antibody purification methods. The Scientist. 2000;14(8):25-8.
Willis et al., Apoptosis Initiated When BH3 Ligands Engage Multiple Bcl-2 Homologs, not Bax or Bak. Science. Feb. 2007;315:856-9.
Willis et al., Proapoptotic Bak is sequestered by Mcl-1 and Bcl-xL, but not Bcl-2, until displaced by BH3-only proteins. Genes Dev. 2005;19:1294-305.
Wolff et al., Monoclonal antibody homodimers: Enhanced antitumor activity in Nude Mice. Cancer Research. 1993;53:2560-5.
Wolter et al., Movement of Bax from the Cytosol to Mitochondria during Apoptosis. J. Cell Biol. 1997;139(5):1281-92.
Yamaguchi et al., Bcl-XL Protects BimEL-induced Bax Conformational Change and Cytochrome c Release Independent of Interacting with Bax or BimEL. J. Biol. Chem. 2002;277(44):41604-12.
Yang et al., Bad, a Heterodimeric Partner for Bcl-XL and Bcl-2, Displaces Bax and Promotes Cell Death. Cell. 1995;80(2):285-91.
Yang et al., Calculation of Protein Conformation from Circular Dichroism. Methods Enzymol. 1986;130:208-69.
Yasuda et al., BNIP3 α: a Human Homolog of Mitochondrial Proapoptotic protein BNIP3. Cancer Res. 1999;59:533-7.
Yi et al., Inhibition of Bid-induced apoptosis by Bcl-2. tBid insertion, Bax translocation, and Bax/Bak oligomerization suppressed. J Biol Chem. May 9, 2003;278(19):16992-9. Epub Mar. 6, 2003.
Zha et al., BH3 Domain of BAD is Required for Heterodimerization with Bcl-XL and Pro-apoptotic Activity. J. Biol. Chem. 1997;272(39):24101-4.
Zha et al., Posttranslational N-Myristoylation of BID as a Molecular Switch for targeting Mitochondria and Apoptosis. Science. 2000;290(5497)1761-5.
Zha et al., Serine Phosphorylation of Death Agonist BAD in Response to Survival Factor Results in Binding to 14-3-3 Not BCL-XL. Cell. 1996;87:619-28.
Zhou et al., Novel mutant-selective EGFR kinase inhibitors against EGFR T790M. Nature. Dec. 24, 2009;462(7276):1070-4.
Zong et al., BH3-only proteins that bind pro-survival Bcl-2 family members fail to induce apoptosis in the absence of Bax and Bak. Genes & Development. 2001;15:1481-6.

\* cited by examiner

SEQUENCE LISTING

```
<160> NUMBER OF SEQ ID NOS: 17

<210> SEQ ID NO 1
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 1

Met Arg Pro Glu Ile Trp Ile Ala Gln Glu Leu Arg Arg Ile Gly Asp
1               5                   10                  15

Glu Phe Asn Ala
            20

<210> SEQ ID NO 2
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 2
```

```
Glu Asp Ile Ile Arg Asn Ile Ala Arg His Leu Ala Gln Val Gly Asp
1               5                   10                  15

Ser Met Asp Arg
            20
```

<210> SEQ ID NO 3
<211> LENGTH: 25
<212> TYPE: PRT
<213> ORGANISM: Artificial Sequence
<220> FEATURE:
<223> OTHER INFORMATION: Synthetic Polypeptide

<400> SEQUENCE: 3

```
Leu Trp Ala Ala Gln Arg Tyr Gly Arg Glu Leu Arg Arg Met Ser Asp
1               5                   10                  15

Glu Phe Glu Gly Ser Phe Lys Gly Leu
            20                  25
```

<210> SEQ ID NO 4
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 4

```
Ala Glu Leu Pro Pro Glu Phe Ala Ala Gln Leu Arg Lys Ile Gly Asp
1               5                   10                  15

Lys Val Tyr Cys
            20
```

<210> SEQ ID NO 5
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 5

```
Pro Ala Asp Leu Lys Asp Glu Cys Ala Gln Leu Arg Arg Ile Gly Asp
1               5                   10                  15

Lys Val Asn Leu
            20
```

<210> SEQ ID NO 6
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 6

```
Glu Gln Trp Ala Arg Glu Ile Gly Ala Gln Leu Arg Arg Met Ala Asp
1               5                   10                  15

Asp Leu Asn Ala
            20
```

<210> SEQ ID NO 7
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 7

```
His Gln Ala Glu Val Gln Ile Ala Arg Lys Leu Gln Leu Ile Ala Asp
1               5                   10                  15

Gln Phe His Arg
            20

<210> SEQ ID NO 8
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 8

Ser Ser Ala Ala Gln Leu Thr Ala Ala Arg Leu Lys Ala Leu Gly Asp
1               5                   10                  15

Glu Leu His Gln
            20

<210> SEQ ID NO 9
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 9

Met Glu Gly Ser Asp Ala Leu Ala Leu Arg Leu Ala Cys Ile Gly Asp
1               5                   10                  15

Glu Met Asp Val
            20

<210> SEQ ID NO 10
<211> LENGTH: 23
<212> TYPE: PRT
<213> ORGANISM: Artificial Sequence
<220> FEATURE:
<223> OTHER INFORMATION: Synthetic Polypeptide

<400> SEQUENCE: 10

Arg Pro Glu Ile Trp Met Thr Gln Gly Leu Arg Arg Leu Gly Asp Glu
1               5                   10                  15

Ile Asn Ala Tyr Tyr Ala Arg
            20

<210> SEQ ID NO 11
<211> LENGTH: 23
<212> TYPE: PRT
<213> ORGANISM: Artificial Sequence
<220> FEATURE:
<223> OTHER INFORMATION: Synthetic Polypeptide

<400> SEQUENCE: 11

Arg Pro Glu Ile Trp Leu Thr Gln Ser Leu Gln Arg Leu Gly Asp Glu
1               5                   10                  15

Ile Asn Ala Tyr Tyr Ala Arg
            20

<210> SEQ ID NO 12
<211> LENGTH: 23
<212> TYPE: PRT
<213> ORGANISM: Artificial Sequence
<220> FEATURE:
<223> OTHER INFORMATION: Synthetic Polypeptide
```

<400> SEQUENCE: 12

Arg Pro Glu Ile Trp Leu Thr Gln His Leu Gln Arg Leu Gly Asp Glu
1               5                   10                  15

Ile Asn Ala Tyr Tyr Ala Arg
            20

<210> SEQ ID NO 13
<211> LENGTH: 23
<212> TYPE: PRT
<213> ORGANISM: Artificial Sequence
<220> FEATURE:
<223> OTHER INFORMATION: Synthetic Polypeptide

<400> SEQUENCE: 13

Arg Pro Glu Ile Trp Met Gly Gln Gly Leu Arg Arg Leu Gly Asp Glu
1               5                   10                  15

Ile Asn Ala Tyr Tyr Ala Arg
            20

<210> SEQ ID NO 14
<211> LENGTH: 23
<212> TYPE: PRT
<213> ORGANISM: Artificial Sequence
<220> FEATURE:
<223> OTHER INFORMATION: Synthetic Polypeptide

<400> SEQUENCE: 14

Arg Pro Glu Ile Trp Leu Gly Gln Ser Leu Gln Arg Leu Gly Asp Glu
1               5                   10                  15

Ile Asn Ala Tyr Tyr Ala Arg
            20

<210> SEQ ID NO 15
<211> LENGTH: 23
<212> TYPE: PRT
<213> ORGANISM: Artificial Sequence
<220> FEATURE:
<223> OTHER INFORMATION: Synthetic Polypeptide

<400> SEQUENCE: 15

Arg Pro Glu Ile Trp Leu Gly Gln His Leu Gln Arg Leu Gly Asp Glu
1               5                   10                  15

Ile Asn Ala Tyr Tyr Ala Arg
            20

<210> SEQ ID NO 16
<211> LENGTH: 23
<212> TYPE: PRT
<213> ORGANISM: Artificial Sequence
<220> FEATURE:
<223> OTHER INFORMATION: Synthetic Polypeptide

<400> SEQUENCE: 16

Gln Trp Val Arg Glu Ile Ala Ala Gly Leu Arg Leu Ala Ala Asp Asn
1               5                   10                  15

Val Asn Ala Gln Leu Glu Arg
            20

<210> SEQ ID NO 17
<211> LENGTH: 20
<212> TYPE: PRT
<213> ORGANISM: Artificial Sequence
<220> FEATURE:
<223> OTHER INFORMATION: Synthetic Polypeptide

```
<400> SEQUENCE: 17

Glu Gln Trp Ala Arg Glu Ile Gly Ala Gln Ala Arg Arg Met Ala Ala
1               5                   10                  15

Asp Leu Asn Ala
            20
```

LIVE CELL IMAGING DYNAMIC BH3 PROFILING

CROSS-REFERENCE TO RELATED APPLICATIONS

This application is a national stage filing under 35 U.S.C. § 371 of International PCT Application No. PCT/US20207019999, filed Feb. 26, 2020, which claims priority under 35 U.S.C. § 119(e) to U.S. Provisional Patent Application No. 62/810,928, filed Feb. 26, 2019, each of which is hereby incorporated by reference in its entirety.

GOVERNMENT SUPPORT STATEMENT

This invention was made with government support under CA205967 awarded by the National Institutes of Health. The government has certain rights in the invention.

BACKGROUND

The vast majority of efforts in precision medicine for cancer try to link static genetic information to cancer biology and from there predict clinical response. A limitation with these approaches is that they represent static observations of dead cells, and a tremendous amount of the functional complexity of a cancer cell has been lost to study. Dynamic BH3 profiling ("DBP") is a precision medicine technology with a functional phenotypic readout that exposes cancer cells to drugs and measures early changes in pro-apoptotic signaling after a brief treatment period ex vivo. DBP on primary patient tumor samples can be carried out to predict clinical response to various drug combinations. However, patient sample quantity can often limit the number of drugs tested by DBP. For example, samples from patients with advanced metastatic solid tumors can only be collected using core needle biopsies, which have low cell yields. Low cells yields can limit the conditions to which the cells may be exposed. In addition, prior art methodologies do not permit determination of pro-apoptotic signaling on a single cell basis in a field of both cancerous cells and non-cancerous cells.

SUMMARY

In some aspects, the present disclosure provides a method of identifying a putative therapeutic agent for treating cancer. In some embodiments, the method comprises providing a test cell portion of a cell population that comprises primary cancerous cells, wherein the test cell portion has been contacted with a test agent (e.g., the test cell portion has been pre-treated with the test agent). The method further involves contacting the test cell portion with a BH3 peptide. The method further involves capturing a series of images of the test cell portion over a time interval by live cell imaging. In some embodiments, the method further involves measuring BH3 peptide-induced mitochondrial outer membrane permeabilization (MOMP) in the test cell portion at different time points in the time interval based on the captured images. In some embodiments, the method further comprises comparing BH3 peptide-induced MOMP measured in the test cell portion to BH3 peptide-induced MOMP in a control cell portion of the cell population, wherein the control cell portion has not been contacted with the test agent. In some embodiments, an increase in BH3 peptide-induced MOMP in the test cell portion compared to that in the control cell portion indicates that the test agent is a putative therapeutic agent for treating cancerous cells of the cell population.

In some embodiments, comparing BH3 peptide-induced MOMP comprises determining a value for delta priming, wherein delta priming is the difference between BH3 peptide-induced MOMP in the test cell portion and BH3 peptide-induced MOMP in the control cell portion. In some embodiments, the value for delta priming is determined at a plurality of the different time points. In some embodiments, the value for delta priming is a peak value that corresponds to a maximum difference in MOMP occurring over the time interval. In some embodiments, the value for delta priming is a peak value that corresponds to a maximum change in MOMP occurring over a portion of the time interval. In some embodiments, the maximum change in MOMP corresponds to an area under the curve measurement derived from the values for delta priming determined at the plurality of the different time points. In some embodiments, the method further comprises determining a summary value for delta priming that corresponds to overall changes in MOMP occurring over the time interval.

In some embodiments, the method further comprises: (i) providing the control cell portion of the cell population, wherein the control cell portion has not been contacted with the test agent; (ii) contacting the control cell portion with the BH3 peptide; (iii) capturing a series of images of the control cell portion over the time interval by live cell imaging; and (iv) measuring BH3 peptide-induced MOMP in the control cell portion at the different time points based on the captured images. In some embodiments, the control cell portion is subjected to the same conditions as the test cell portion, except for the absence of pre-treatment with test agent. In some embodiments, the method further comprises the pre-treatment step of contacting the test cell portion with the test agent.

In some embodiments, the test cell portion is contacted with the BH3 peptide at a first peptide concentration, and the method further comprises contacting the test cell portion later in time with the BH3 peptide at a second increased peptide concentration after measuring BH3 peptide-induced MOMP at the first peptide concentration. In some embodiments, the method described above is performed at the second increased peptide concentration. In some embodiments, the first peptide concentration is at least 0.001 µM and not exceeding 1 µM, at least 0.001 µM and not exceeding 0.1 µM, at least 0.001 µM and not exceeding 0.01 µM, at least 0.005 µM and not exceeding 0.1 µM, or at least 0.005 µM and not exceeding 0.01 µM.

In some embodiments, the test cell portion and the control cell portion comprise a detectable marker for cancerous cells, and BH3 peptide-induced MOMP is measured only in cells comprising the detectable marker. In some embodiments, the detectable marker is an intracellular tumor marker, an extracellular tumor marker, or a cell surface tumor marker. In some embodiments, the method further comprises staining the test and control cell portions with an antibody for the detectable marker, and detecting staining for the antibody to identify cancerous cells. In some embodiments, the detectable marker is selected from the group consisting of an epithelial cell adhesion molecule (EpCam), a keratin protein, a smooth muscle actin protein, a c-kit protein, an S-100 protein, or a vimentin protein. In some embodiments, the detectable marker is one or more morphological characteristics that differentiate cancerous cells from non-cancerous cells. In some embodiments the detectable marker is a cell surface marker such as prostate specific membrane antigen or Her2. In some embodiments, the detectable marker is a cell surface marker for non-cancerous cells. In some embodiments, MOMP is not detected in the non-cancerous cells and in other embodiments MOMP is detected in the non-cancerous cells and that MOMP value is subtracted from the MOMP value determined for the cancerous cells. In any of the embodiments, the markers can be used to distinguish cancerous cells from non-cancerous cells whereby MOMP in cancer cells may be more selectively determined.

In some embodiments, cells of the test and control cell portions are attached to a solid surface. In some embodiments, the attached cells are present at a concentration whereby at least 90%, 95%, 98%, or even at least 99% of the cells are not contacting one another. In some embodiments, the attached cells do not exceed 10,000 cells. In some embodiments, the attached cells are present from at least 100 cells and up to 10,000 cells, at least 100 cells and not exceeding 1,000 cells, at least 1,000 cells, at least 1,000 cells and not exceeding 5,000 cells, or at least 5,000 cells. In some embodiments, the solid surface is coated with one or more pro-adhesive agents. In some embodiments, the one or more pro-adhesive agents comprise an extracellular matrix protein selected from the group consisting of collagen 1, laminin, collagen 4, and fibronectin. In some embodiments, the cells are adherent cells. In some embodiments the solid surface is a well in a multi-well plate.

In some embodiments, cells of the test and control cell portions are permeabilized prior to contacting with the BH3 peptide. In some embodiments, cells of the test and control cell portions are permeabilized by contacting the cells with a solution comprising a permeabilizing reagent and the BH3 peptide. In some embodiments, the permeabilizing reagent is a detergent (e.g., digitonin, saponin).

In some aspects, the present disclosure provides a method of evaluating a test agent in cancerous cells. In some embodiments, the method comprises contacting a sample of cells with a BH3 peptide, wherein the sample comprises cancerous cells that have been contacted with a test agent (e.g., the sample has been pre-treated with the test agent). In some embodiments, the method further comprises capturing a series of images of individual cells in the sample over a time interval by live cell imaging. The method further involves measuring the level of BH3 peptide-induced MOMP in a plurality of the individual cells at different time points in the time interval based on the captured images. The method further involves evaluating individual cells in the plurality to determine if the level of BH3 peptide-induced MOMP reaches a pre-set value at a time point in the time interval. In some embodiments, the method further comprises determining the time point for each individual cell in the plurality that reaches the pre-set value in the level of BH3 peptide-induced MOMP. In some embodiments, the test agent is more cytotoxic in cells that reach the pre-set value at an earlier time point in the time interval relative to cells that reach the pre-set value at a later time point. In some embodiments, cells that do not reach the pre-set value are resistant to the test agent.

In some embodiments, the pre-set value is a pre-set change in the level of BH3 peptide-induced MOMP for an individual cell relative to a control level. In some embodiments, the control level is a level of MOMP measured in the individual cell prior to contacting with the BH3 peptide. In some embodiments, the control level is a level of MOMP measured in the individual cell after contacting with the BH3 peptide. In some embodiments, the control level is an average based on the level of MOMP measured at more than one time point. In some embodiments, the pre-set value is a percent change in the level of BH3 peptide-induced MOMP of between about 20% and about 80%. In some embodiments, the pre-set value is a percent change in the level of BH3 peptide-induced MOMP of between about 40% and about 60%. In some embodiments, the pre-set value is a percent change in the level of BH3 peptide-induced MOMP of about 50%.

In some embodiments, the method further comprises subjecting cells that do not reach the pre-set value to further analysis of a property of the cells other than MOMP. In some embodiments, the further analysis comprises at least one of a genomic analysis, a transcriptomic analysis, a proteomic analysis, and a morphological analysis. In some embodiments, the further analysis is performed to evaluate one or more properties of the cells that correlate with resistance to the test agent.

In accordance with any of the foregoing embodiments, BH3 peptide-induced MOMP (e.g., the level or amount of BH3 peptide-induced MOMP) can be determined by measuring mitochondrial integrity. In some embodiments, BH3 peptide-induced MOMP is determined by one or more of: measuring mitochondrial membrane potential; measuring the release of cytochrome c from mitochondria; and measuring the retention of cytochrome c in mitochondria. In some embodiments, BH3 peptide-induced MOMP is measured by detecting the emission of a potentiometric dye. In some embodiments, the potentiometric dye is a rhodamine dye or a cyanine dye. In some embodiments, the potentiometric dye is selected from the group consisting of: tetramethylrhodamine, ethyl ester (TMRE); tetramethylrhodamine, methyl ester (TMRM); 5,5',6,6'-tetrachloro-1,1',3,3'-tetraethylbenzimidazolylcarbocyanine iodide (JC-1); and dihydrorhodamine 123.

In some embodiments, the cell population or sample of cells comprise primary cancerous cells (e.g., isolated primary cancerous cells). In some embodiments, the cell population or sample of cells is obtained from a core biopsy sample, a primary human tumor sample, or a patient derived xenograft (PDX).

In some embodiments, the BH3 peptide is derived from the BH3 domain of a polypeptide selected from the group consisting of BIM, BID, BAD, Noxa A, Noxa B, PUMA, BMF, HRK, and BIK. In some embodiments, the BH3 peptide is a non-natural BH3 peptide selected from the group consisting of MS1, MS2, MS3, and FS1.

In some embodiments, the live cell imaging is live single-cell imaging.

In another aspect of the invention, BH3 profiling is conducted on cells not first contacted with a test agent, to determine the native state of the cell without test agent perturbation. In some embodiments, the method comprises providing a test cell portion of a cell population that comprises primary cancerous cells. In some embodiments, the method further involves contacting the test cell portion with a BH3 peptide. In some embodiments, the method further involves capturing a series of images of the test cell portion over a time interval by live cell imaging. In some embodiments, the method further involves measuring BH3 peptide-induced mitochondrial outer membrane permeabilization (MOMP) in the test cell portion at different time points in the time interval based on the captured images. In some embodiments, the method further comprises comparing BH3 peptide-induced MOMP measured in the test cell portion to BH3 peptide-induced MOMP in a control cell portion of the cell population, wherein the control cell portion has not been contacted with the BH3 peptide. In some embodiments, an increase in BH3 peptide-induced MOMP in the test cell portion compared to that in the control cell portion indicates a BH3 profile of the test cell portion. In some embodiments, BH3 profiling is conducted on one or more additional test cell portions of the cell population using one or more different BH3 peptides, as described herein, to obtain additional information on the native state of the cell (e.g., relating to resistance of the cells to treatment, relating to anti-apoptotic BCL-2 protein dependence, relating to susceptibility to treatment with cytotoxic chemotherapy).

In some embodiments, the test cell portion is contacted with the BH3 peptide at a first peptide concentration, and the method further comprises contacting the test cell portion later in time with the BH3 peptide at a second increased peptide concentration after measuring BH3 peptide-induced MOMP at the first peptide concentration. In some embodiments, the method described above is performed at the second increased peptide concentration. In some embodiments, the first peptide concentration is at least 0.001 µM and not exceeding 1 µM, at least 0.001 µM and not exceeding 0.1 µM, at least 0.001 µM and not exceeding 0.01 µM, at least 0.005 µM and not exceeding 0.1 µM, or at least 0.005 µM and not exceeding 0.01 µM. Other conditions such as the use of detectable markers and solid surfaces for detecting individual cancer cells, as well as increasing BH3 concentrations are as described above.

In any of the foregoing embodiments, identification of cancerous cells and the measurement of MOMP can be accomplished manually or can be accomplished through the use of software to recognize the cells of interest and measure MOMP.

The details of certain embodiments of the invention are set forth in the Detailed Description of Certain Embodiments, as described below. Other features, objects, and advantages of the invention will be apparent from the Definitions, Examples, Figures, and Claims.

BRIEF DESCRIPTION OF THE DRAWINGS

The following drawings form part of the present specification and are included to further demonstrate certain aspects of the present disclosure, which can be better understood by reference to one or more of these drawings in combination with the detailed description of specific embodiments presented herein. It is to be understood that the data illustrated in the drawings in no way limit the scope of the disclosure.

FIG. 1A shows a workflow for live cell imaging dynamic BH3 profiling (LCI-DBP). FIG. 1B shows how different drug treatments can accelerate loss in mitochondrial potential at different time points (top plot), and how this information corresponds to drug-induced increases in apoptotic priming (bottom plot). FIG. 1C shows a workflow for LCI-DBP with cell-specific staining by immunofluorescence in a mixed cell sample.

FIG. 2A depicts images of Panc8902 cells treated with vehicle control (top panels) or A1331852, a Bcl-XL inhibitor (bottom panels). The treated cells were contacted with BH3 peptide and imaged at different time points using a nuclear stain and TMRE, a potentiometric dye that measures mitochondrial transmembrane potential. FIG. 2B shows single-cell data plots of TMRE loss in cells treated with vehicle control (left panel) or A1331852 (right panel). Each row represents a unique cell, and each column represents a single time point. FIG. 2C shows TMRE intensity of single-cell traces of cells averaged per drug treatment. FIG. 2D shows delta priming of TMRE intensity for cells per drug treatment. FIG. 2E shows area under the curve measurement (AUC) for delta priming quantification in FIG. 2D. FIG. 2F shows a comparison of LCI-DBP measurements to conventional fixed cell measurements of delta priming.

FIG. 3A depicts images of MMTV-PyMT-T1 cells treated with vehicle control (top panels) or 17-DMAG, a targeted cancer therapeutic (bottom panels). The treated cells were contacted with BH3 peptide and imaged at different time points using a nuclear stain and TMRE. FIG. 3B shows TMRE intensity of single-cell traces of cells averaged per drug treatment. FIG. 3C shows delta priming of TMRE intensity for cells per drug treatment. FIG. 3D shows area under the curve measurement (AUC) for delta priming quantification in FIG. 3C. FIG. 3E shows single-cell data plots of TMRE loss in cells treated with vehicle control (left panel) or 17-DMAG (right panel). Each row represents a unique cell, and each column represents a single time point. FIG. 3F shows in vivo response to different drug treatments. FIG. 3G shows a comparison of LCI-DBP to in vivo responses for different drug treatments.

FIG. 5A shows a single-cell data plot of TMRE loss in cells treated with vehicle control. Each row represents a unique cell, and each column represents a single time point. FIG. 5B shows a single-cell data plot of TMRE loss in cells treated with Navitoclax, a Bcl-2 and Bcl-XL inhibitor. Each row represents a unique cell, and each column represents a single time point. FIG. 5C is a histogram showing half-time of TMRE loss in single cells treated with vehicle control or Navitoclax.

DETAILED DESCRIPTION

Dynamic BH3 profiling is a technique that briefly exposes cancer cells ex vivo to different test agents and measures early changes in net pro-apoptotic signaling in mitochondria. These drug-induced changes, which are quantified by measuring mitochondrial outer membrane permeabilization (MOMP), take place well before overt cell death occurs and can predict eventual overt cell death of cancer cells from targeted agents in vitro and in vivo for both hematologic and solid tumors. Dynamic BH3 profiling therefore allows the identification of therapeutic agents that are most likely to benefit a patient.

Profiling cells based on MOMP has been described in the art. These techniques are described in detail in PCT Publication Nos. WO2014/047342, WO2015/042249, WO2016/176299, and WO2016/176299, the contents of each of which are incorporated by reference herein.

There are a number of limitations to the profiling strategies that have been undertaken in the past. For example, they do not lend themselves to working with very limited cell populations, which is often the case when dealing with core needle biopsies and tumors that are not easily resected. These strategies also do not allow live cell measurements in single cells, and such measurements are therefore unable to distinguish between cancerous cells and other cells that are present in a population such as a biopsy, which other cells in certain instances can be as much as 50% of cells in the population. Additionally, previous strategies do not lend themselves to performing numerous profiling assays on the same set of cells. For example, they do not permit repeated exposure of cells to sequential increases in BH3 peptide concentration.

In some aspects, the present disclosure relates to the discovery that MOMP can be measured at different time points over the course of exposure to a BH3 peptide and that valuable measurements can be derived therefrom. In some embodiments, BH3 peptide-induced MOMP is measured at different time points by live cell imaging. Live cell imaging may be used to capture a series of images over a time interval that includes a plurality of different time points.

Figure 1A:
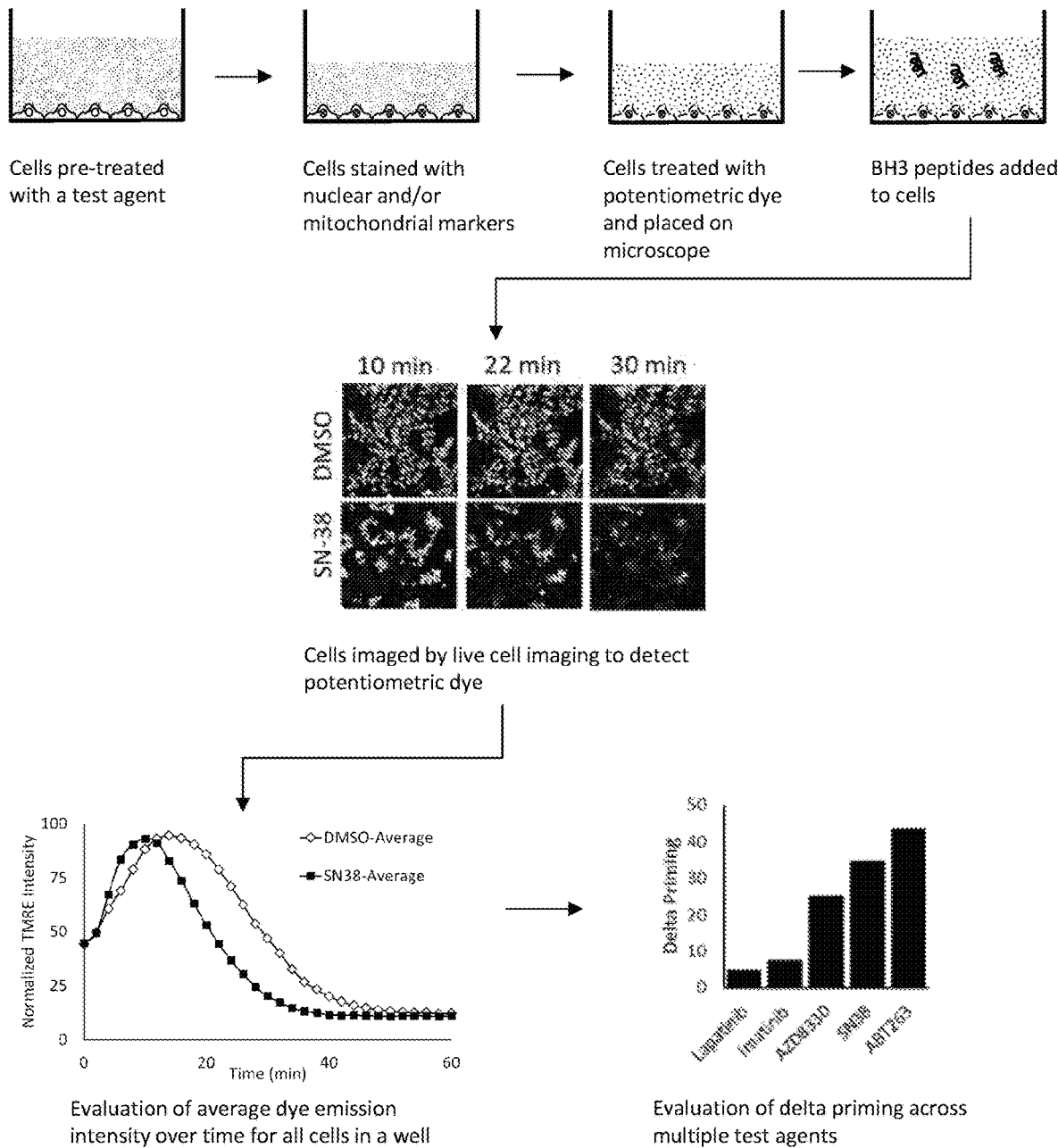
FIGS. 1A-1C show example workflows and analyses in accordance with the present disclosure.

An example workflow of live cell imaging dynamic BH3 profiling (LCI-DBP) is depicted in FIG. 1A. As shown, in some embodiments, cells are plated in a well (e.g., a well of a multi-well plate). In some embodiments, the plated cells are contacted with a test agent or a control solution (e.g., a vehicle solution used with the test agent, such as water, buffer, or a solvent), and the test agent is incubated with the cells for a treatment period. In some embodiments, the treated cells are stained with desired markers for imaging (e.g., nuclear and/or mitochondrial markers). In some embodiments, the cells are then treated with a reagent for measuring MOMP, such as a potentiometric dye. In some embodiments, the stained and treated cells are then contacted with a BH3 peptide.

Cells treated with BH3 peptide are imaged by live cell imaging to detect the reagent for measuring MOMP. As shown in FIG. 1A, in some embodiments, cells are imaged to measure a decrease in emission over time from a potentiometric dye. In some embodiments, a decrease in emission from the potentiometric dye indicates a loss in mitochondrial membrane potential, which serves as a surrogate measure for MOMP. In some embodiments, the loss in emission from the potentiometric dye is evaluated for cells treated with the test agent as compared with cells that were not treated with the test agent. In some embodiments, the difference in emission between treated and untreated cells is determined to obtain a parameter referred to herein as delta priming. Image analysis software, or any suitable algorithm known to one skilled in the art, may be used to determine the difference in emission, or it may be determined manually.

As used herein, in some embodiments, delta priming is a readout of dynamic BH3 profiling that represents the degree of short term change in the proximity of a cell to the threshold of apoptosis in response to a particular test agent. In some embodiments, delta priming is determined based on the difference between BH3 peptide-induced MOMP in cells treated with a test agent and BH3 peptide-induced MOMP in cells not treated with the test agent.

Accordingly, in some embodiments, LCI-DBP is used to determine delta priming for one or more test agents in cells of a sample. In some embodiments, delta priming is used as a comparative parameter for different treatments in the sample, e.g., as shown by the bar graph depicted in FIG. 1A. In this example, ABT263 may be said to have the highest value for delta priming, and would therefore represent the most effective treatment for killing cells used in this example.

Figure 1B:
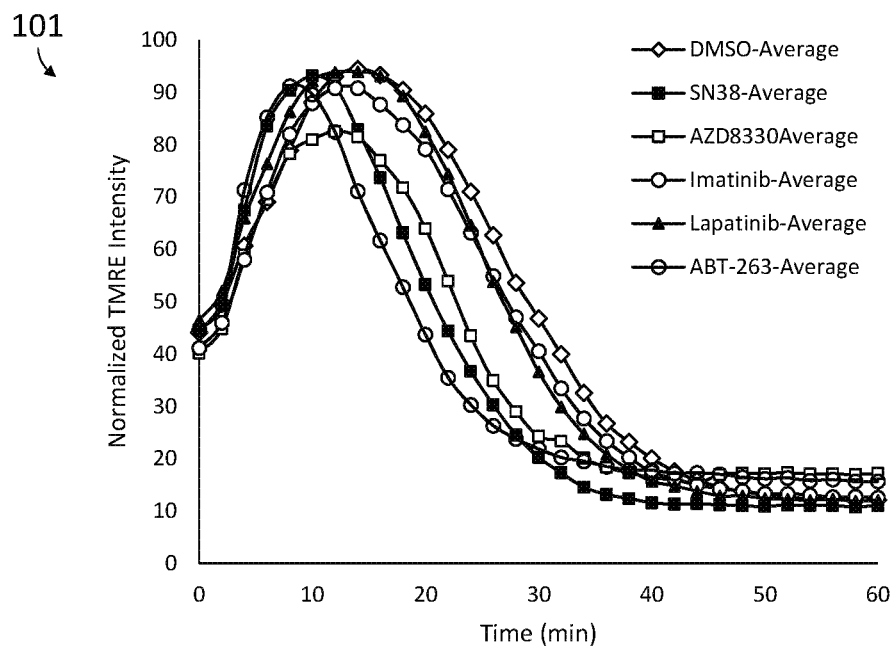
Figure 1B:
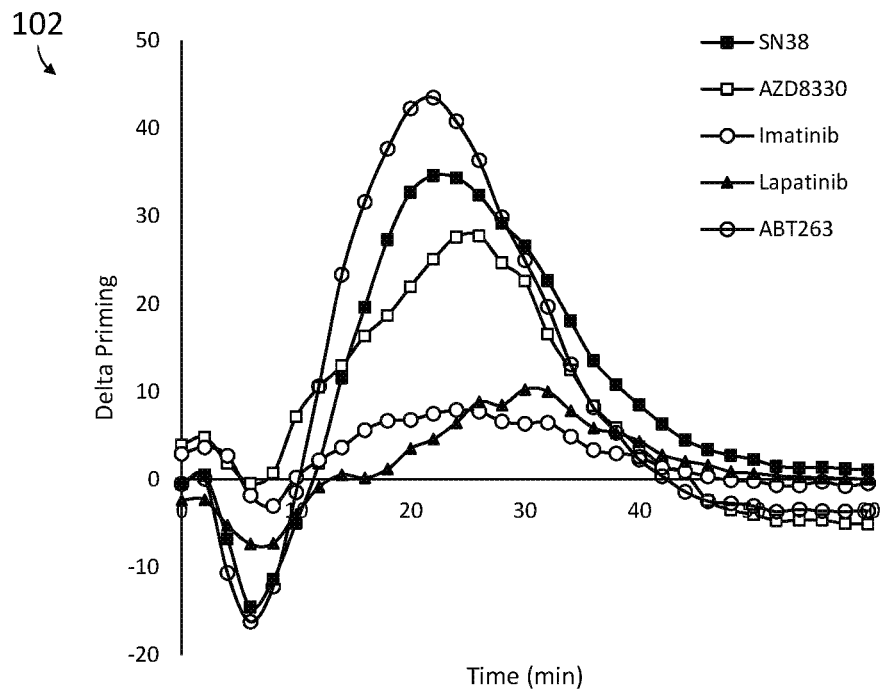

In some aspects, the disclosure relates to the surprising discovery that live cell imaging can be used to evaluate delta priming at different time points over the course of exposure to a BH3 peptide, which can provide more valuable information as compared with previous single-cell techniques which evaluated delta priming based on a single time point following peptide exposure. FIG. 1B provides an example of this analysis and illustrates the valuable information that can be obtained in accordance with the disclosure.

As described above, in some embodiments, live cell imaging can be performed by measuring a loss in mitochondrial transmembrane potential for cells in response to various test agents, which may be visualized by a plot 101 of emission intensity from a potentiometric dye over time following BH3 peptide treatment. As shown, between approximately 10 minutes and approximately 40 minutes into measurement, the different test agents accelerated loss in emission at different time points. Previous profiling strategies have focused on a single fixed end point for measuring MOMP, which is generally at 60 minutes. As shown in plot 101, recording mitochondrial integrity at the 60 minute time point would provide minimal or no drug sensitivity information. Moreover, the valuable information between the 10 and 40 minute time points will have been lost. While a lower BH3 peptide concentration might differentiate apoptotic drug sensitivity at the 60 minute time points, there is no way of knowing the optimal concentration of BH3 peptide to use with a particular cell sample a priori, which is problematic when there is limited sample (e.g., from a core biopsy). Accordingly, LCI-DBP overcomes these limitations and allows more information to be obtained with each experiment, and more experiments to be performed on a given sample.

In some embodiments, measurements of MOMP by live cell imaging can be further evaluated by determining delta priming at a plurality of time points rather than a single fixed end point. Delta priming at individual time points is calculated as described herein and may be visualized by a plot 102 of delta priming over time, which illustrates increases in apoptotic priming caused by the different test agents. In some embodiments, an optimal treatment is identified based on a single time point corresponding to a peak in delta priming. In some embodiments, an optimal treatment is identified based on a plurality of time points over the course of BH3 peptide exposure, or based on a plurality of time points within a portion of the time interval corresponding to the course of BH3 peptide exposure. Each treatment curve of plot 102 may be further analyzed by calculating a summary delta priming parameter that is obtained by determining area under curve (AUC) for a particular treatment.

One aspect of the invention is the ability to evaluate the differential effects of a test drug across individual cells in the same cell population. Because the level of MOMP can be measured in individual cells over time, a test agent can be evaluated by determining how long it takes each cell in a cell population to reach a pre-set value in the level of MOMP. In this way, cells that reach the pre-set value at a relatively later time point (or not at all) are those cells in the cell population that are most resistant to the test agent.

The inventors surprisingly found that drug-treated cells, which were cells of a cell line and expected to have the same or similar properties, exhibited a differential response to the drug across individual cells. As one non-limiting example, FIG. 5B depicts experimental results showing single-cell measurements of BH3 peptide-induced MOMP (as measured by emission from a potentiometric dye) in drug-treated cells over 120 minutes. For the purposes of this experiment, a pre-set value of 0.50 (corresponding to a 50% loss in emission) was used to evaluate cells. As shown, individual cells above the dashed line did not reach the pre-set value over the course of the 120 minutes. Without wishing to be bound by theory, it is thought that these cells (Cell ID 450-500, approximately) possess one or more properties which confer resistance to the drug. By subjecting these cells to further analysis to evaluate treatment resistance, a more effective therapeutic strategy can be determined for these cells (e.g., a combination therapy or an alternative monotherapy).

In some embodiments, measurements of BH3 peptide-induced MOMP by live cell imaging can be evaluated by determining if the level of MOMP in individual cells reaches a pre-set value. In some embodiments, the pre-set value is a pre-set change (e.g., an increase or a decrease) in the level of MOMP for an individual cell relative to a control level. The control level can be a level of MOMP measured in the cell before or after contact with a BH3 peptide. In some embodiments, the level of MOMP at different time points can be normalized based on the control level. The level of MOMP can be normalized, for example, by dividing the level of MOMP at each time point by the control level. In some embodiments, the control level is determined as an average based on the level of MOMP measured at more than one time point.

In some embodiments, the pre-set value is a percent change in the level of MOMP. In some embodiments, the pre-set value is a percent change in the level of BH3 peptide-induced MOMP of at least 10% (e.g., at least 20%, at least 30%, at least 50%, at least 70%, at least 80%, or higher). In some embodiments, the pre-set value is a percent change in the level of BH3 peptide-induced MOMP of between about 20% and about 80%, between about 25% and about 75%, between about 40% and about 60%, or between about 50% and about 75%. In some embodiments, the pre-set value is a percent change in the level of BH3 peptide-induced MOMP of about 50%.

In some embodiments, individual cells are evaluated by determining a time point at which the level of BH3 peptide-induced MOMP reaches the pre-set value. In some embodiments, the time point is one of a plurality of different time points at which the level of MOMP is measured. In some embodiments, the time point is determined by inference or extrapolation based on the level of MOMP measured at one or more of the plurality of different time points. In some embodiments, individual cells determined not to reach the pre-set value in the time interval can be assigned the last measured time point, an extrapolated time point, or separately categorized as having no time point. The time point for individual cells can be determined by manual or automated (e.g., software) means.

For a sample of cells pre-treated with a test agent, an earlier time point in certain cells relative to others is indicative of a higher cytotoxic response to the test agent in those cells. In some embodiments, individual cells determined to reach the pre-set value at a later time point, or not at all, during the time interval can be subjected to further analysis to determine a property of the cells that correlates with resistance to treatment. Treatment resistance can be analyzed by methods known in the art, including any suitable techniques for genomic analysis, transcriptomic analysis, proteomic analysis, and morphological analysis.

One aspect of the invention is the ability to take meaningful measurements from a limited number of cancerous cells. Because measurements can be made on an individual cell basis, the quantities of cells needed is much reduced. Because measurements can be made selectively on cancerous cells, the quantities of cells needed is much reduced as background noise is reduced.

One aspect of the invention is the ability to expose primary cancerous cells, which are limited in number, to more than a single set of conditions. Because the cells are living when the measurements are made, the same cells may be tested more than once according to an aspect of the invention. For example, it is difficult to know in advance whether the concentration of BH3 peptide employed will be too low to detect MOMP or too high such that there is no difference in the MOMP measurement over time. According to this aspect of the invention, a test cell portion is contacted with the BH3 peptide at a first peptide concentration (e.g., a first contacting step), and MOMP measurements are taken over time. Then, if the concentration of BH3 peptide is determined to be too low, the method further involves contacting the test cell portion with the BH3 peptide at a second increased peptide concentration (e.g., a second contacting step) after measuring BH3 peptide-induced MOMP at the first peptide concentration. This permits images to be taken at a BH3 concentration suitable for the measurements described above, using one aliquot of cells. Suitable concentrations are in a range, for example, of at least 0.001 µM and not exceeding 1 µM. Initial and succeeding concentrations can be, for example, at least 0.001 µM, at least 0.005 µM, at least 0.01 µM, at least 0.1 µM, and at least 0.5 µM.

Accordingly, in some embodiments, a sample comprising a test cell portion is contacted with a BH3 peptide in a first contacting step (e.g., following a pre-treatment step of contacting with a test agent), which results in the sample comprising an initial peptide concentration. In some embodiments, the test cell portion of the sample is imaged at the initial peptide concentration to measure BH3 peptide-induced MOMP. In some embodiments, the sample is contacted with the BH3 peptide in a second contacting step, which results in the sample comprising an increased peptide concentration relative to the initial peptide concentration in the sample. In some embodiments, the test cell portion of the sample is imaged at the increased peptide concentration to measure BH3 peptide-induced MOMP. In some embodiments, one or more additional contacting steps (e.g., a third, a fourth, a fifth, etc.) can be performed to further increase the concentration of the BH3 peptide in the sample, where the test cell portion of the sample can be imaged after each contacting step to measure BH3 peptide-induced MOMP at the increased concentration.

In some embodiments, each contacting step comprises a separate addition of BH3 peptide to a sample (e.g., a sample comprising a test cell portion). For example, when a sample is contacted with BH3 peptide in solution form, a first contacting step results in the sample comprising an initial peptide concentration in a first sample volume. A second contacting step results in the sample comprising an increased peptide concentration in a second sample volume, where the second sample volume is increased relative to the first by an amount corresponding to the volume of BH3 peptide solution added to the sample. Accordingly, the BH3 peptide in solution form should be of a sufficient concentration such that the increase in sample volume after contacting does not result in a decrease (or no change) in peptide concentration in the sample (e.g., by dilution).

In some embodiments, a contacting step comprises an increase in BH3 peptide concentration in a sample by between about 0.001 µM and about 1.0 µM. BH3 peptide concentration can be increased in a contacting step, for example, by at least 0.001 µM, at least 0.005 µM, at least 0.01 µM, at least 0.1 µM, at least 0.5 µM, or at least 1.0 µM. BH3 peptide concentration can be increased in a contacting step by 10%, 25%, 50%, 75%, 100%, 150%, 250%, 500%, 1,000%, or more, relative to the BH3 peptide concentration prior to the contacting step. In a successive (e.g., second) contacting step, the amount by which BH3 peptide concentration is to be increased can be determined based on BH3 peptide-induced MOMP measured in a preceding (e.g., first) contacting step, although the increase can be based on a predetermined amount.

In some embodiments, a contacting step can be separated from a successive contacting step by between about 10 seconds and about 60 minutes. For example, a first contacting step can be separated from a second contacting step by at least 10 seconds and up to 60 minutes. In some embodiments, a contacting step is separated from a successive contacting step by between about 10 seconds and about 30 minutes (e.g., between about 10 seconds and about 10 minutes, between about 10 seconds and about 5 minutes, between about 10 seconds and about 2 minutes, between about 10 seconds and about 1 minute, between about 30 seconds and about 10 minutes, between about 30 seconds and about 3 minutes, or between about 1 minute and about 10 minutes).

According to an aspect of the invention, cells (e.g., a sample of cells, cells in the test cell portion and the control cell portion of a cell population) can be identified with a detectable marker for cancerous cells, and BH3 peptide-induced MOMP is measured only in cells comprising the detectable marker. Such markers are well known and include, for example, intracellular tumor markers and extracellular tumor markers. In one aspect, the target cells are stained with an antibody for the detectable marker, and one then can detect the antibody to identify cancerous cells. Examples of detectable markers include epithelial cell adhesion molecule (EpCam), a keratin protein, a smooth muscle actin protein, a c-kit protein, an S-100 protein, or a vimentin protein. Other examples include, for example, a labeled peptide, a small molecule, a nucleic acid, or a dye. Other examples include one or more morphological characteristics that differentiate cancerous cells from non-cancerous cells.

According to another aspect of the invention, cells (e.g., a sample of cells, cells in the test cell portion and the control cell portion of a cell population) can be identified with a detectable marker for non-cancerous cells, and cells comprising the detectable marker are excluded from measuring BH3 peptide-induced MOMP. In this way, the information from non-cancerous cells and various sample debris may be excluded from the analysis of cancer cells in the sample. In some embodiments, the detectable marker for non-cancerous cells is a marker for a cell type not known to be cancerous (e.g., a marker for cells known to be benign, or otherwise healthy or normal cell types which may be present in a sample comprising the non-cancerous cells).

In some embodiments, the detectable marker for cancerous and/or non-cancerous cells is one or more morphological characteristics that differentiate non-cancerous cells from cancerous cells. For example, in some embodiments, cancerous and/or non-cancerous cells are differentiated from one another by one or more morphological characteristics based on the images. Morphological characteristics of the cells may be evaluated manually or by an automated process, such as an imaging software or an algorithm. Examples of morphological characteristics include, without limitation, the rate of cell growth and division, cell size, cell shape, variation in cell size or shape, nucleus size, nucleus color, chromosomal arrangement and/or number of chromosomes detected, and cell boundary.

Technology, including software, fluorescent dyes, and systems for selectively detecting and processing images of cancerous cells (or non-cancerous cells) and that permit imaging by an optical sensor are known in the art and described, e.g., in U.S. Publication Nos. 2009/0299196, 2018/0021090, 2006/0089554, and U.S. Pat. No. 6,537,211, the contents of each of which are incorporated herein by reference. In some embodiments, identification of cancerous cells is automated by an instrument. For example, in some embodiments, cancerous cells in a mixed cell population are detected by a fluorescence detector, or a detector of one or more morphological characteristics which differentiate cancerous cells from non-cancerous cells (e.g., cell size, cell shape, cell membrane characteristics, etc.). In some embodiments, cancerous cells in a mixed cell population are detected manually, e.g., by visual inspection of cell images, and correlated with standard data for fluorescence intensity or strength of emission.

One aspect of the invention permits distinguishing cancerous cells from other cells so that MOMP measurements are based on MOMP in the cancerous cells which are the target cell population. Another distinct aspect of the invention permits the measurement of MOMP in individual cells. All of this can be automated using technology such as is described in the preceding paragraph.

In some aspects, cancerous cells are evaluated in accordance with the application. In some embodiments, cancerous cells are obtained from a core biopsy sample, a primary human tumor sample, or a patient derived xenograft (PDX). In some embodiments, the cancerous cells comprise an immortalized cancer cell line. In some embodiments, the cells are immortalized mouse or human cancer cell lines. Established cancer cell lines are well-known in the art and include for example pancreatic cancer cell lines (e.g., YAPC, Panc02.03 and SU86.86, etc.), breast cancer cell lines (e.g., AU565, BT-20, CAL-120, HMEL and KPL-1, etc.), kidney cancer lines (e.g., 769-P, ACNH, HEK TE, SLR 20 and UMRC2, etc.), bone cancer cell lines (e.g., CAL-78, HOS, MG-63 and SK-ES-1, etc.) and lymphoid cancer cell lines (e.g., AML-193, BDCM, CML-T1 and JM1, etc.). The skilled artisan recognizes other cancer cell lines, for example those disclosed in Barretina et al. (The Cancer Cell Line Encyclopedia enables predictive modelling of anticancer drug sensitivity. Nature. 2012 Mar. 28; 483(7391):603-7. doi: 10.1038/nature11003).

In some embodiments, cells are derived from a subject. For example, cancer cells may be isolated from a subject by a surgical technique (e.g., biopsy, resection). Thus, in some embodiments, the cells are primary tumor cells. In some embodiments, the cells comprise a patient-derived xenograft (PDX), which refers to a tissue generated by the implantation of cancerous primary tumor into an immunodeficient mouse.

A cell population (e.g., a sample of cells) can comprise one or more cell types present in a subject. In some embodiments, a cell population comprises a lymphocyte (e.g., a white blood cell). In some embodiments, a cell population does not comprise a lymphocyte. Non-limiting examples of cell types include, without limitation, lymphocytes, myocytes, neurons, cardiomyocytes, glial cells, epithelial cells, hematopoietic stem cells, stem cells, erythrocytes, alveoli, osteoclasts, osteoblasts, osteocytes, hepatocytes, thymocytes, renal cells, adipocytes, Kupffer cells, pyramidal cells, thymus cells, lymph node cells, thyroid cells, stomach cells, oral cavity cells, esophageal cells, tracheal cells, small intestine cells, large intestine cells, rectal cells, appendix cells, vaginal cells, pancreatic cells, liver cells, gall bladder cells, lung cells, brain cells, eye cells, and skin cells.

A cell population can be derived from a tissue of a subject. Non-limiting examples of tissues from which cells of the provided methods may be derived include, without limitation, blood, spleen, thymus, lymph node, thyroid gland, cardiac, neural (e.g., central or peripheral), bone, skeletal muscle, smooth muscle, stomach, oral cavity, esophagus, trachea, small intestine, large intestine, rectum, appendix, vagina, pancreas, liver, gall bladder, lung, brain, eye, skin, and hair.

In some embodiments, cells are cancerous cells. The cancerous cells may be from a primary (e.g., first instance) cancer and/or from a relapsed (e.g., second or subsequent instance) cancer. Cancerous cells may be derived from any type of cancer, including pancreatic cancer, liver cancer, stomach cancer, lung cancer, esophageal cancer, tracheal cancer, oral cancer, small intestine cancer, large intestine cancer, rectal cancer, lymphoma, leukemia, thyroid cancer, brain cancer, bone cancer, sarcoma, ocular cancer, ovarian cancer, breast cancer, uterine cancer, melanoma, myosarcoma, multiple myeloma, prostate cancer, bladder cancer, kidney cancer, head and neck cancer, acute lymphoblastic leukemia, acute myeloid leukemia, adrenocortical carcinoma, anal cancer, astrocytoma, cardiac cancer, cervical cancer, cholangiocarcinoma, chronic lymphocytic leukemia, chronic myelogenous leukemia, colorectal cancer, craniopharyngioma, endometrial cancer, neuroblastoma, non-small cell lung cancer, penile cancer, pharyngeal cancer, and rhabdomyosarcoma.

In some embodiments of any of the provided methods, cells (e.g., cells of the test and control cell portions) are attached to a solid surface. In some embodiments, the solid surface is coated with one or more pro-adhesive agents. In some embodiments, the one or more pro-adhesive agents is an extracellular matrix (ECM) protein. In some embodiments, the ECM protein is selected from the group consisting of collagen 1, laminin, collagen 4, and fibronectin. In some embodiments, the one or more pro-adhesive agents is an antibody. In some embodiments, the one or more pro-adhesive compounds is streptavidin or neutravidin.

In some embodiments, cells are plated to minimize cell overlap as viewed from an imaging device. Accordingly, in some embodiments, cells are plated in cell counts based on the surface area of a well. In some embodiments, the attached cells are present at a concentration whereby 95% of the cells are not contacting one another. In some embodiments, the attached cells do not exceed 10,000 cells. In some embodiments, the attached cells are present from at least 100 cells and up to 10,000 cells, at least 100 cells and not exceeding 1,000 cells, at least 1,000 cells, at least 1,000 cells and not exceeding 5,000 cells, or at least 5,000 cells.

BH3 Profiling and Dynamic BH3 Profiling

In some embodiments, methods of the present disclosure comprise contacting cells (e.g., cancerous cells that have been pre-treated with a test agent) with a BH3 peptide. After contacting the cells with a BH3 peptide, BH3 peptide-induced mitochondrial outer membrane permeabilization (MOMP) is measured in the cells. MOMP is regarded as the point of no return in cellular commitment to apoptosis via the intrinsic apoptotic pathway. MOMP is regulated by the B-cell lymphoma 2 (BCL-2) family of proteins and can be activated by a variety of cellular stressors, including DNA damage, growth factor or nutrient deprivation, and treatment with a cytotoxic agent. The basal state of the mitochondrial apoptotic pathway can alter the eventual fate of the cell, as different cells can vary in the degree to which they are primed to undergo MOMP.

BH3 profiling is a functional assay that measures apoptotic priming, or the proximity of cellular mitochondria to the apoptotic threshold. BH3 profiling is described in US 2016/0231314, US 2017/0184567, and US 2018/0128813, each of which is incorporated by reference herein. Briefly, BH3 profiling directly measures apoptotic priming by delivering distinct pro-apoptotic death signals (BH3 peptides) to mitochondria while monitoring MOMP. The assay uses peptides derived from the BH3 domain of the pro-apoptotic BH3-only proteins to provoke a response from the mitochondria. Priming, also referred to as apoptotic priming or mitochondrial priming, can be determined by measuring BH3 peptide-induced MOMP, for example, by monitoring mitochondrial integrity as described herein.

In some embodiments, methods of the present disclosure comprise determining a value for apoptotic priming. In some embodiments, the value for apoptotic priming is a time point at which the level of BH3 peptide-induced MOMP in an individual cell reaches a pre-set value. In some embodiments, the time point is one of a plurality of different time points at which the level of MOMP is measured. In some embodiments, the time point is determined by inference or extrapolation based on the level of MOMP measured at one or more of the plurality of different time points. In some embodiments, the value for apoptotic priming is determined for a plurality of cells in a sample by measuring the area under the curve for the level of MOMP measured at the plurality of different time points. The value for apoptotic priming can be determined by manual or automated (e.g., software) means. In some embodiments, apoptotic priming can be determined for purposes of BH3 profiling as previously described. In some embodiments, apoptotic priming can be determined for drug-treated cells to evaluate treatment response in individual cells of a sample.

Dynamic BH3 profiling is a precision medicine assay that directly measures drug-induced changes in apoptotic priming. Dynamic BH3 profiling is described in U.S. Pat. No. 10,393,733 and US 2018/0120297, each of which is incorporated by reference herein. Briefly, dynamic BH3 profiling integrates net changes in BCL-2 family members after treatment with a therapy, measuring total pro-apoptotic signaling. Cells are pre-treated with a test drug and the effect on priming is measured by BH3 profiling. An increase in priming in drug-treated cells compared to untreated cells is referred to as delta priming. Delta priming distinguishes cells to be killed by a therapy and therefore predicts therapies that will have a cytotoxic effect before the event in various models and on patient samples. Delta priming can be used to predict cytotoxic response to a therapy in vitro, in vivo, and in the clinic.

In some embodiments, methods of the present disclosure comprise determining a value for delta priming. In some embodiments, delta priming is the difference between BH3 peptide-induced MOMP in drug-treated cells of a sample and BH3 peptide-induced MOMP in untreated cells of the sample. In some embodiments, delta priming is calculated at one or more time points in a time interval according to the formula: $\Delta(t) = \text{MOMP}_{untreated}(t) - \text{MOMP}_{treated}(t)$. Other suitable methods of determining a value for delta priming are provided herein and are known in the art (see, e.g., U.S. Pat. No. 10,393,733 and US 2018/0120297).

BH3 Peptides

In some embodiments, a BH3 peptide comprises an amino acid sequence corresponding to the BCL-2 homology domain 3 (BH3 domain) of a pro-apoptotic BCL-2 family protein. Non-limiting examples of pro-apoptotic BCL-2 family proteins from which BH3 peptides may be derived include: BIM (BCL-2 interacting mediator of cell death), BID (BH3 interacting domain death agonist), BAD (BCL-2-associated death promoter), Noxa, PUMA (p53 up-regulated modulator of apoptosis), BMF (BCL-2-modifying factor), HRK (harakiri), and BIK (BCL-2 interacting killer). In some embodiments, a BH3 peptide comprises an amino acid sequence of an engineered BH3 peptide. Engineered BH3 peptides have been designed which display a desired affinity and specificity for targeting certain anti-apoptotic BCL-2 proteins. Examples of engineered BH3 peptides include MS1, MS2, MS3, and FS1 (see, e.g., Foight, et al. ACS Chem Biol. 2014 Sep. 19; 9(9):1962-8).

In some embodiments, a BH3 peptide includes an amino acid sequence selected from Table 1. PUMA2A is a negative control peptide which may be used to provide a representative measurement for no mitochondrial depolarization.

TABLE 1

BH3 Peptide Sequences

| Peptide | Sequence |
| --- | --- |
| BIM | MRPEIWIAQELRRIGDEFNA |
| BID | EDIIRNIARHLAQVGDSMDR |
| BAD | LWAAQRYGRELRRMSDEFEGSFKGL |
| Noxa A | AELPPEFAAQLRKIGDKVYC |
| Noxa B | PADLKDECAQLRRIGDKVNL |
| PUMA | EQWAREIGAQLRRMADDLNA |
| BMF | HQAEVQIARKLQLIADQFHR |
| HRK | SSAAQLTAARLKALGDELHQ |
| BIK | MEGSDALALRLACIGDEMDV |
| MS1 | RPEIWMTQGLRRLGDEINAYYAR |
| MS2 | RPEIWLTQSLQRLGDEINAYYAR |
| MS3 | RPEIWLTQHLQRLGDEINAYYAR |
| A12 | RPEIWMGQGLRRLGDEINAYYAR |
| B3 | RPEIWLGQSLQRLGDEINAYYAR |
| G9 | RPEIWLGQHLQRLGDEINAYYAR |
| FS1 | QWVREIAAGLRLAADNVNAQLER |
| PUMA2A | EQWAREIGAQARRMAADLNA |

In some embodiments, a BH3 peptide includes an amino acid sequence that is at least 70%, at least 80%, at least 90%, or at least 95% identical to an amino acid sequence selected from Table 1. In some embodiments, a BH3 peptide includes an amino acid sequence that is between about 70% and about 80%, between about 80% and about 90%, between about 80% and about 95%, or between about 90% and about 95% identical to an amino acid sequence selected from Table 1.

BH3 peptides can be modified at an N-terminal residue, a C-terminal residue, an internal residue, or any combination thereof. Peptide modifications can include, without limitation: acetylation, amidation, biotinylation, cinnamoylation, farnesylation, formylation, myristoylation, palmitoylation, phosphorylation (e.g., phosphorylation at a serine, tyrosine, and/or threonine residue), stearoylation, succinylation, sulfurylation, and cyclisation (e.g., via disulfide bridges or amide cyclisation). In some embodiments, a BH3 peptide comprises more than one type of modification on the polypeptide. For example, in some embodiments, a BH3 peptide amino acid sequence selected from Table 1 comprises an acetylated N-terminal residue and an amidated C-terminal residue.

BH3 peptide modifications also include one or more amino acid additions to a BH3 peptide amino acid sequence selected from Table 1. In some embodiments, an addition is an aromatic amino acid addition to permit or enhance measurement of peptide concentration (e.g., by UV absorbance measurement). For example, as shown in Table 1, the amino acid sequences corresponding to the BH3 peptides of BID, Noxa B, HRK, BMF, and BIK do not include an aromatic amino acid. Accordingly, in some embodiments, a BH3 peptide (e.g., BID, Noxa B, HRK, BMF, BIK) further comprises an added aromatic amino acid at the N-terminus or C-terminus. Examples of aromatic amino acids among the canonical twenty amino acids include tyrosine, tryptophan, and phenylalanine. Additional examples of aromatic amino acids that can be added to a BH3 peptide include unnatural amino acids with aromatic side chains (see, e.g., Liu CC and Schultz PG. Annu Rev Biochem. 2010; 79:413-44). BH3 peptide modifications can also include one or more amino acid deletions (e.g., relative to a BH3 peptide amino acid sequence selected from Table 1).

BH3 peptide modifications can also include one or more amino acid substitutions (e.g., relative to a BH3 peptide amino acid sequence selected from Table 1). An amino acid substitution can be a conservative substitution (e.g., hydrophobic amino acid for hydrophobic amino acid) or a non-conservative substitution (e.g., aromatic amino acid for hydrophobic amino acid). In some embodiments, an amino acid substitution comprises an aromatic amino acid (e.g., tyrosine, tryptophan, phenylalanine) substitution for a non-aromatic amino acid. Aromatic amino acid substitutions can be useful in amino acid sequences otherwise lacking one or more aromatic amino acids, as aromatic side chains may be used in absorption and/or fluorescence spectroscopy (e.g., to measure concentration). In some embodiments, an amino acid substitution comprises a non-natural amino acid substitution for a natural (e.g., canonical) amino acid. Non-limiting examples of non-natural amino acids include D-amino acids, homo-amino acids, N-methyl amino acids, alpha-methyl amino acids, beta (homo) amino acids, gamma amino acids, helix/turn stabilizing motifs, and backbone modifications (e.g., peptoids).

Optionally, a BH3 peptide is attached to a transduction domain. A transduction domain directs a peptide in which it is present to a desired cellular destination. Thus, the transduction domain can direct the peptide across the plasma membrane and into the cytoplasm (e.g., from outside the cell, through the plasma membrane, and into the cytoplasm). Accordingly, a transduction domain may be used in methods of the disclosure without requiring cell membrane permeabilization. Alternatively, or in addition, the transduction domain can direct the peptide to a desired location within the cell, such as the nucleus, the ribosome, the ER, mitochondria, a lysosome, or a peroxisome. In some embodiments, a transduction domain is derived from a known membrane-translocating sequence. Alternatively, a transduction domain is a compound that is known to facilitate membrane uptake such as polyethylene glycol, cholesterol moieties, octanoic acid, and decanoic acid. The transduction domain may be linked either to the N-terminal or the C-terminal end of a BH3 peptide.

A BH3 peptide can comprise a polymer of L-amino acids, D-amino acids, or a combination of both. In some embodiments, a BH3 domain peptide is a cyclic or stapled peptide. Cyclic peptides are prepared by methods known in the art. For example, macrocyclization is often accomplished by forming an amide bond between the peptide N- and C-termini, between a side chain and the N- or C-terminus (see, e.g., Samson et al., Endocrinology, 137: 5182-5185 (1996)), or between two amino acid side chains (see, e.g., DeGrado, Adv Protein Chem, 39: 51-124 (1988)).

In some embodiments, a BH3 peptide is a recombinant molecule or a synthetic molecule. Accordingly, a BH3 peptide can be prepared using modern cloning techniques, recombinant DNA techniques, or may be synthesized chemically using standard peptide synthesis techniques. In some embodiments, native BH3 domain peptides can be isolated from cells or tissue sources by an appropriate purification scheme using standard protein purification techniques. In some embodiments, a BH3 peptide is modified to maintain its secondary structure, e.g., α-helical structure. Methods of helix stabilization are known in the art.

In some embodiments, a BH3 peptide is an isolated or purified BH3 peptide. An "isolated" or "purified" BH3 domain peptide is substantially free of cellular material or other contaminating proteins from the cell or tissue source from which the BH3 domain peptide is derived, or substantially free from chemical precursors or other chemicals when chemically synthesized.

In some embodiments, a BH3 peptide is fewer than 195 amino acids in length, e.g., fewer than or equal to 150, 100, 75, 50, 40, 35, 30, 25, 20, or 15 amino acids in length. In some embodiments, a BH3 peptide is between about 10 and about 150 amino acids in length, between about 10 and about 100 amino acids in length, between about 10 and about 75 amino acids in length, between about 10 and about 50 amino acids in length, between about 10 and about 40 amino acids in length, between about 10 and about 35 amino acids in length, between about 10 and about 30 amino acids in length, between about 10 and about 25 amino acids in length, between about 10 and about 20 amino acids in length, or between about 10 and about 15 amino acids in length.

In some embodiments, in a method in accordance with the application, the method comprises permeabilizing the cell after, prior to, or simultaneously when contacting with the BH3 peptide. Generally, permeabilization refers to the process of treating a cell with a reagent such that the cell membrane becomes permeable without permeabilizing the mitochondrial outer membrane. Reagents used for permeabilization include organic solvents (e.g., acetone and methanol) and detergents (e.g., digitonin, saponin, Triton X-100 and Tween-20). Without wishing to be bound by any particular theory, the cell is permeabilized to permit the BH3 peptides access to the mitochondria. Cells are permeabilized by methods known in the art. For example, the cells are permeabilized by contacting the cell with digitonin, saponin, methanol, Triton X-100, or other art-recognized cell permeabilization reagents. In some embodiments, cells are contacted with a BH3 profiling buffer that comprises the permeabilizing reagent, such as digitonin or saponin.

In some embodiments, cells are imaged within 3 hours of being contacted with a BH3 peptide. For example, in some embodiments, cells are imaged within 3 hours, within 2 hours, within 1 hour, within 30 minutes, within 20 minutes, within 10 minutes, within 5 minutes, or within 1 minute of being contacted with a BH3 peptide. In some embodiments, a BH3 peptide is contacted with cells while the cells are being imaged, e.g., within the time duration of live cell imaging.

As described herein, in some embodiments, BH3 peptide-induced MOMP is determined by measuring mitochondrial integrity. Mitochondrial integrity can be measured, for example, by measuring mitochondrial membrane potential. In some embodiments, mitochondrial membrane potential is measured by detecting the emission of a potentiometric dye. Potentiometric dyes are dyes which change their spectral properties in response to voltage changes. Many physiological processes are accompanied by changes in cell membrane potential which can be detected with potentiometric dyes, such as a change in mitochondrial transmembrane potential. A distinctive feature of the early stages of programmed cell death is the disruption of active mitochondria, which can be measured by potentiometric dyes. Examples of potentiometric dyes include, without limitation, tetramethylrhodamine, ethyl ester (TMRE), tetramethylrhodamine, methyl ester (TMRM), 5,5',6,6'-tetrachloro-1,1',3,3'-tetraethylbenzimidazolylcarbocyanine iodide (JC-1), and dihydrorhodamine 123. Mitochondrial integrity (e.g., BH3 peptide-induced MOMP) can also be measured by measuring the release of cytochrome c from mitochondria or the retention of cytochrome c in mitochondria. Methods of monitoring cytochrome c by live cell imaging have been described in the art (see, e.g., Gao et al. *J. Cell Sci*. (2001) 114(Pt 15):2855-2862; Waterhouse et al. *Cell Death and Differentiation* (2003) 10:853-855; and Maes et al. (2017) *PLOS One* (2017) 12(9):e0184434, the content of each of which is incorporated herein by reference).

In some embodiments, BH3 peptide-induced MOMP is measured based on a series of images captured by live cell imaging. Measurements can be obtained from imaging data using any of a number of methods known in the art. For example, imaging data can be transformed into measurements by automated means (e.g., using software or any automated algorithm which may or may not be associated with the imaging device). The analysis and measurement of mitochondrial integrity by imaging has been described (see, e.g., Al-Zubaidi et al. *Molecular Human Reproduction* (2019) 25:11; Mitra et al. *Curr. Protoc. Cell Biol*. (2010) 4.25:1-21; and Walsh et al. *Scientific Reports* (2017) 7:46684, the content of each of which is incorporated by reference herein).

Test Agents

As described herein, in some aspects, the present disclosure provides methods of evaluating a test agent in cancerous cells. In some embodiments, a test agent includes a compound. In some embodiments, a test agent includes more than one compound. In some embodiments, a test agent has a molecular weight of less than 1,000, 900, 800, 700, 600, 500, 450, 400, 350, 300, 250, 200, or 150 g/mol. In some embodiments, a test agent has a molecular weight from about 100 g/mol to about 500 g/mol, inclusive. In some embodiments, a test agent has a molecular weight from about 200 g/mol to about 800 g/mol, inclusive. In some embodiments, a test agent has a molecular weight from about 500 g/mol to about 1,000 g/mol, inclusive. Exemplary test agents include, but are not limited to, small organic molecules, small inorganic molecules, peptides, proteins, protein analogs, enzymes, nucleic acids, nucleic acid analogs, antibodies, antigens, hormones, lipids, polysaccharides, growth factors, viruses, cells, bioactive agents, pharmaceutical agents, and combinations and prodrugs thereof.

In some embodiments, a test agent is an anticancer agent, such as a chemotherapeutic agent, a targeted cancer therapeutic, or an inhibitor of one or more anti-apoptotic BCL-2 proteins (e.g., a BH3 mimetic). Further exemplary test agents include, but are not limited to, gases, fine particles, radiation, electromagnetic radiation, and aerosols.

In some embodiments, a test agent is a chemotherapeutic agent. Non-limiting examples of chemotherapeutic agents include small molecules, peptides or proteins (e.g., peptide antibiotics and antibodies), and RNA-interference (RNAi) molecules. Examples of small molecule chemotherapeutic agents include alkylating agents (cyclophosphamide, chlormethine, temozolomide), anthracyclines (daunorubicin, doxorubicin, mitoxantrone), taxanes (paclitaxel, docetaxel), histone deacetylase inhibitors (vorinostat, romidepsin), topoisomerase I/II inhibitors (irinotecan, topotecan, etoposide), kinase inhibitors (gefitinib, imatinib, bortezomib), nucleotide analogs and precursor analogs (azacitidine, fluorouracil, methotrexate), platinum-based agents (cisplatin, carboplatin), retinoids (alitretinoin, bexarotene), Hsp90 inhibitors (17-DMAG), and vinca alkaloids (vinblastine, vindesine, vinorelbine). Examples of peptides and proteins include bleomycin, dactinomycin, and antitumor antibodies (anti-HER2/neu, alemtuzumab, trastuzumab, brentuximab). The skilled artisan recognizes chemotherapeutic RNAi molecules as RNAi molecules that target expression of genes related to cancer. For example, RNAi molecules directed against HoxA1 can inhibit mammary tumor cell formation, as disclosed by Brock et al. Sci Transl Med 6: 217ra2 (2014). In some embodiments, chemotherapeutic agents include, but are not limited to, kinase inhibitors, apoptosis inducers, angiogenesis inhibitors, and monoclonal antibodies.

A person of skill in the art would appreciate that aspects of the present disclosure can be useful in the optimization of a test agent for therapeutic purposes. For example, in some embodiments, it is advantageous for a test agent (e.g., a therapeutic agent, a cancer therapeutic) to have minimal toxicity in non-cancerous (e.g., healthy) cells and maximal toxicity in cancerous cells. As described herein, such a test agent would manifest as having a minimal value for delta priming in non-cancerous cells and a maximal value for delta priming in cancerous cells.

In some aspects, methods of the present disclosure may be used in drug discovery. In some embodiments, methods described by the disclosure are useful for screening large libraries of different test agents to identify putative therapeutic agents for treating cancer, e.g., agents that increase mitochondrial priming. In some embodiments, a library of test agents includes 20 or more, 30 or more, 40 or more, 50 or more, 60 or more, 70 or more, 80 or more, 90 or more, 100 or more, 150 or more, 200 or more, 250 or more, or 300 or more test agents.

In some aspects, methods of the present disclosure may be used in personalized medicine. In some embodiments, methods described herein are useful for the customization of chemotherapeutic regimens. For example, in some embodiments, methods provided herein can be used to determine the toxicity of a test agent in both non-cancerous cells and cancerous cells based on delta priming parameters determined in both cell types. In some embodiments, the non-cancerous cells and the cancerous cells are obtained from a subject. By determining the toxicity of a test agent in non-cancerous cells (e.g., normal cells, healthy cells) from the subject and determining the toxicity of the test agent in cancerous cells from the subject, the test agent can be identified as being more or less appropriate for treating the subject. In some embodiments, the test agent becomes more appropriate for treating the subject as the ratio of a summary delta priming parameter in cancerous cells to the summary delta priming parameter in non-cancerous cells increases. For example, in determining an appropriate test agent for treating a subject who is known to have or is suspected of having cancer, it is preferable to use a test agent that has minimal toxicity (e.g., minimal value for delta priming) in non-cancerous cells of the patient and maximal toxicity (e.g., maximal value for delta priming) in cancerous cells of the patient. Such an agent would preferentially target the cells intended for treatment while minimizing negative peripheral effects.

In some embodiments, a test cell portion is treated with a test agent for a treatment incubation period before the test cell portion is contacted with a BH3 peptide. In some embodiments, the treatment incubation period is between about 6 and about 48 hours. For example, in some embodiments, the treatment incubation period is between about 6 and about 36 hours, between about 6 and about 24 hours, between about 6 and about 18 hours, between about 6 and about 12 hours, between about 12 and about 48 hours, between about 12 and about 36 hours, between about 12 and about 24 hours, between about 12 and about 18 hours, between about 18 and about 48 hours, between about 18 and about 36 hours, between about 18 and about 24 hours, or between about 24 and about 48 hours. In some embodiments, the treatment incubation period is about 12 hours, about 18 hours, about 24 hours, about 36 hours, about 48 hours, or more.

In some aspects, the disclosure provides methods of determining the toxicity of a test agent, wherein the toxicity of the agent is determined by comparing BH3 peptide-induced MOMP in test cells contacted with the agent to BH3 peptide-induced MOMP to control cells not contacted with the agent. In some embodiments, the control cells have not been contacted with any agent. In some embodiments, the control cells have been contacted with buffer or solvent, e.g., buffer or solvent used as a vehicle for the agent. For example, a test cell portion can be contacted with a test agent that has been dissolved in a suitable buffer or solvent (e.g., DMSO), and a control cell portion can be contacted with a suitable buffer or solvent (e.g., DMSO) lacking the agent.

The skilled artisan recognizes several methods for adding a test agent or vehicle, a BH3 peptide, and/or one or more stains or dyes to cells. For example, automated liquid handling systems are generally utilized for high throughput drug screening. Automated liquid handling systems utilize arrays of liquid dispensing vessels, controlled by a robotic arm, to distribute fixed volumes of liquid to the wells of an assay plate. Generally, the arrays comprise 96, 384, or 1536 liquid dispensing tips corresponding to the wells of a plate. Non-limiting examples of automated liquid handling systems include digital dispensers (e.g., HP D300 Digital Dispenser) and pinning machines (e.g., MULTI-BLOT™ Replicator System, CyBio, Perkin Elmer Janus). Non-automated methods are also contemplated by the disclosure, and include but are not limited to a manual digital repeat multichannel pipette.

EXAMPLES

Example 1. Materials and Methods

LCI-DBP Buffers

LCI-DBP Initial Staining Solution was prepared by combining 4 mL warmed media, 8 µL Hoechst 33342 (bisbenzimide) for nuclear staining, and 8 µL of 1 mM MitoTracker® Green for mitochondrial staining. LCI-DBP Wash Buffer was prepared by combining 20 mL warmed 1×DTEB Buffer, 40 µL of 10 mg/mL oligomycin, and 40 µL of 100 µM TMRE for measuring changes in mitochondrial transmembrane potential.

TABLE 2

1X DTEB Buffer.

| Item | Stock Concentration | Amount Used | [Final] | Product Number |
|---|---|---|---|---|
| Trehalose | 378.33 g/mol | 51.07 g | 135 mM | T9449 |
| HEPES-KOH pH 7.4 | 238.31 g/mol | 2.38 g | 10 mM | H4034 |
| KCl | 74.56 mM | 3.73 g | 50 mM | P5405 |
| EGTA | 250 mM | 80.00 µL | 0.02 mM | E3889 |
| EDTA | 500 mM | 40.00 µL | 0.02 mM | E6758 |
| BSA | w/v | 1.00 g | 0.1% | 001-000-162 |
| Succinate | 118.09 g/mol | 0.59 g | 5 mM | S3674 |

1×DTEB Buffer was prepared by adding 800 µL water to an autoclaved flask. The materials in Table 2 were gathered and added to the flask, and the flask was placed on a stir plate in a chemical hood. The materials were stirred in the flask and the solution pH was adjusted to 7.4 using KOH. The solution was placed in a graduated cylinder and made up to 1 L total. The solution was filtered by vacuum filtration and stored at 4° C.

LCI-DBP Digitonin Buffer was prepared by combining 5 mL wash buffer and 2 µL of 5% digitonin. LCI-DBP BIM Buffer (100 µM) was prepared by combining 200 µL Digitonin Buffer and 2 µL of 10 mM BIM. LCI-DBP BIM Buffer (10, 1, 0.1, 0.01, and 0.001 µM) was prepared by combining 180 µL Digitonin Buffer and 20 µL of LCI-DBP BIM Buffer (100 µM), and serially diluted for the remaining concentrations.

Collagenase IV—Core Biopsies

Materials for this protocol included: warmed media with 10% FBS (primaries start with AD. DMEM/F12), 10,000 U/mL DNAse I in Buffer C (according to manufacturer instructions), 10,000 U/mL Hyaluronidase in POBS sterile filtered, 100 mg/mL collagenase IV (approximately 16,000 U/mL) in PBS sterile filtered, 50 mL conical tube, 60 cm petri dish, 96 well plate, razor blade and safety gloves, 200 µL pipette tips (cut with a razor so that the tissue pieces can be pipetted), 100-micron filter, and ice cold HBSS (optional).

The collagenase IV solution was made fresh by adding 5 mL media to the conical tube, and adding to the media: 65 µL DNAse I, 50 µL Hyaluronidase, and 100 µL Collagenase IV. A volume of 100 µL of the collagenase IV solution was placed into one well of a 96 well plate.

The dissociation protocol was as follows. Tissue was transferred to a 60 cm petri dish. The tissue was cut into small pieces by slicing the core as thinly as possible. The tissue was placed into the well on the 96 well plate with the collagenase IV solution, and the solution was pipetted up and down several times with cut tips. The plate was incubated at 37° C. for 5-10 minutes. The well was viewed under a microscope to determine if more dissociation should occur. If the sample was not dissociated enough, the incubation step was repeated. The dissociated cells were placed into a 15 mL conical tube with 1 mL of media. The dissociated cells were filtered through a 100-micron filter and spun at 600 g for 5 minutes. The cells were then plated on collagen coated plates.

Collagen Coating Plate Protocol

A collagen solution was prepared in acetic acid according to the following protocol. An acetic acid solution (0.1 M) was prepared by placing 50 mL water into a conical tube and adding 288 µL glacial acetic acid. Collagen I (Sigma C7661) was added to the 0.1 M acetic acid to obtain a 1 mg/mL collagen solution. The collagen solution was allowed to stir at room temperature for 1-3 hours until dissolved.

For low volume assays, polystyrene 384-well plates (Corning® 3542 plates) were used. The area per well in a 3542 plate is 0.0319 cm$^2$. The total plating volume for 10 µL per well and 20 µg/cm$^2$ collagen was calculated according to the following formulas:

i) plates×wells/plate×10 µL=total solution (µL)

ii) 20 µg/cm$^2$×0.0319 cm$^2$/well×wells/plate=µg/plate iii) µg/plate×plates=total collagen (m)

iv) total solution−collagen needed=PBS needed

The solution was plated in batches using a Thermo Scientific™ Multidrop™ Combi (speed high, full plate, 384 standard, 10 µL, default protocol) and left overnight at 4° C. The plates were washed three times with PBS using the automated plate washer, leaving a 5 µL residual volume of PBS. High grade paper towels were cut to fit the plate, the plate was covered, and the inverted plate was centrifuged (400 RPM or 50 g for 3 minutes). The plate can optionally be UV radiated.

LCI-DBP Protocol

The plates with cells were stained with 10 µL per well of LCI-Staining Solution for 20 minutes at 37° C. in a 3307 Steri-Cult Incubator, Class 100 HEP. An EL406™ Combination Microplate Washer Dispenser was then used to aspirate the volume in the wells to 10 µL. The plates with cells were washed three times with LCI-Wash buffer to a final residual volume of 10 µL per well using the EL406™ Combination Microplate Washer Dispenser. The plate was then placed on an ImageXpress® Micro 4 High Content Screening System with the required settings, taking an image every two minutes. After two images, 10 µL of the selected LCI-DBP BIM peptide buffer(s) were added to the wells. The plate was then imaged for at most 2 hours.

For cell-specific staining of cancerous cells, the plate is removed from the microscope and fixed with 20 µL/well of 4% paraformaldehyde (PFA). After a 15-minute incubation at room temperature, the plate is aspirated to 20 µL residual volume using the EL406™ Combination Microplate Washer Dispenser. The plate is neutralized using N2 Buffer for a 5-minute incubation time at room temperature. The plate is again aspirated to a 20 µL residual volume with the Microplate Washer Dispenser. A 10 µL volume of 3× Stain Solution (plus selected antibodies) is added to each well and left sealed overnight at 4° C. After at least 24 hours, the plate may be washed three times with the Microplate Washer Dispenser using 1×PBS to a residual volume of 20 µL. The plate is then reimaged at the required settings.

Figure 1C:
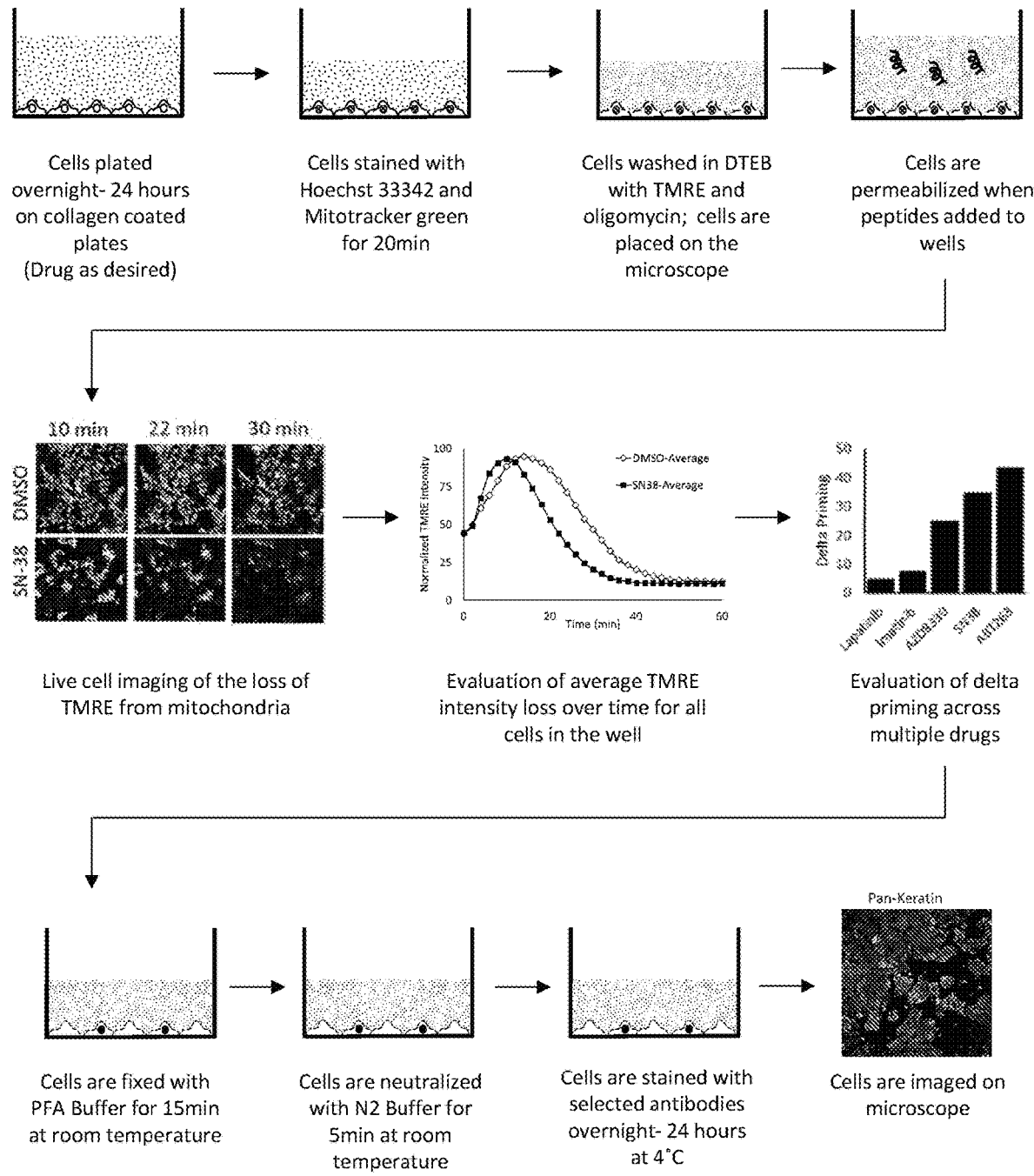

An example workflow for LCI-DBP and immunofluorescence staining is shown in FIG. 1C. As depicted, cells are plated on collagen-coated plates and allowed to incubate for 16-24 hours in the presence of a test agent. The incubated cells are then stained with Hoescht 33342 and MitoTracker® Green for 20 minutes. The stained cells are washed in DTEB with TMRE and oligomycin, and the plate is placed on the microscope. Washed cells are then permeabilized with detergent (e.g., digitonin) when BH3 peptide is added to the wells. Using a high content widefield microscope (IXM4, Molecular Devices), cells are continuously imaged to measure the kinetics of peptide induced TMRE loss from mitochondria. After all images are acquired, image analysis software is used to quantify differences in TMRE release between drug-treated cells and vehicle-treated cells.

Following live cell imaging, cells are fixed with PFA buffer for 15 minutes at room temperature. The fixed cells are neutralized with N2 buffer for 5 minutes at room temperature. Cells are then stained with desired antibodies, such as antibodies specific for tumor markers or apoptotic markers like cytochrome c. The stained cells are allowed to incubate for 12-24 hours at 4° C. The incubated cells are then imaged on a microscope to detect the desired staining.

Example 2. LCI-DBP on a Pancreatic 8902 Cell Line

LCI-DBP was carried out on a Pancreatic 8902 (Panc8902) cell line to evaluate cell sensitivity to different drug treatments (FIGS. 2A-2F). Panc8902 cells were plated in 384-well plates at 2,000 cells per well. Cells were treated with either DMSO (vehicle) or A1331852 (a Bcl-XL inhibitor). Wells containing cells treated with DMSO served as undrugged control standards. After the plated cells were treated overnight, cells were stained with LCI-DBP Initial Staining Solution and then washed with LCI-DBP Wash Buffer. The cells were permeabilized with digitonin and treated with BIM BH3 peptide (10 μM final in each well) by the addition of LCI-DBP BIM Buffer (100 μM).

Figure 2A:
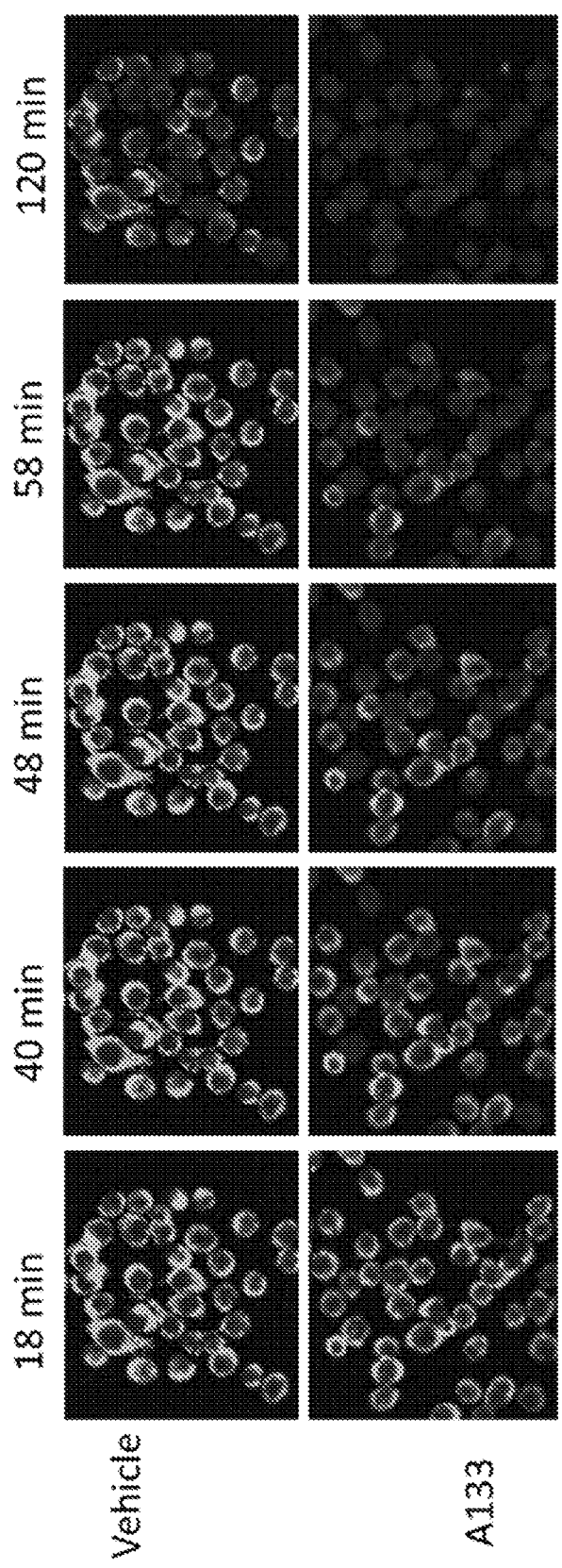
FIGS. 2A-2F show an example of LCI-DBP on a Pancreatic 8902 cell line showing different sensitivities to drug treatments.
Figure 2B:
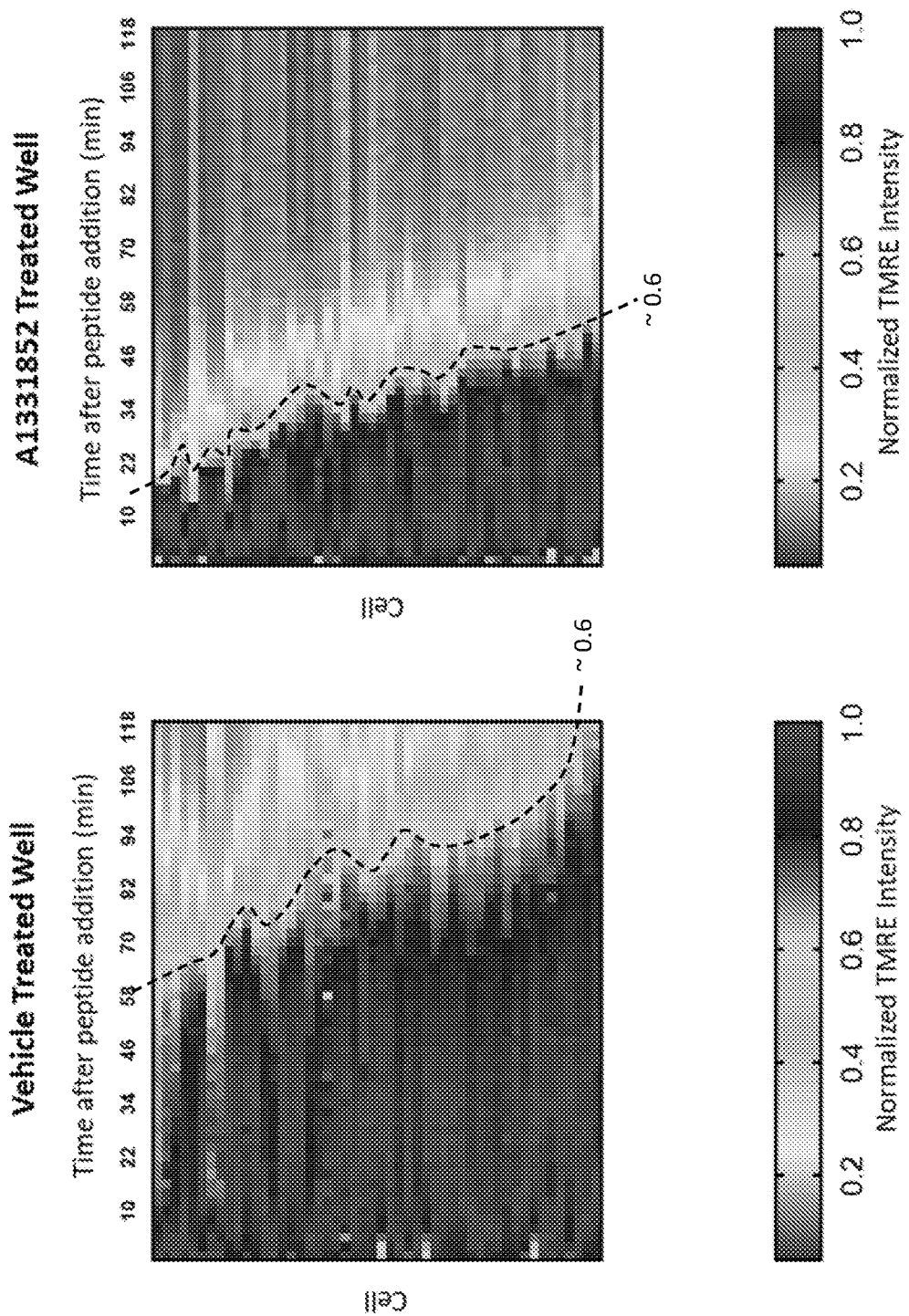

Cells were imaged by live single-cell imaging at 18 minutes, 40 minutes, 48 minutes, 58 minutes, and 120 minutes following BH3 peptide addition (FIG. 2A). Nuclear staining was detected as a blue emission from Hoechst 33342, and mitochondrial transmembrane potential staining was detected as a green emission from TMRE. As shown, drug-treated cells had an observable accelerated loss in mitochondrial potential (bottom panels) compared to undrugged cells (top panels), as detected by a loss in TMRE emission over time. This differential is further visualized in FIG. 2B, which shows single-cell data plots of TMRE loss in Panc8902 cells treated with DMSO (left plot) or treated with A1331852 (right plot). Each row in a plot represents a unique cell, and each column represents a single time point. A dashed line is shown as an overlay on each plot corresponding to TMRE emission intensity of approximately 0.60 (~40% loss in normalized TMRE emission intensity).

LCI-DBP was carried out as described for additional test drugs (etoposide, idarubicin, and STS) in Panc8902 cells. The relative loss in mitochondrial potential across treatments as measured by live cell imaging is shown in FIG. 2C, which is a plot of TMRE intensity of single-cell traces averaged per drug treatment (normalized to maximum relative fluorescence units (RFU) per cell trace).

Figures 2C, 2D:
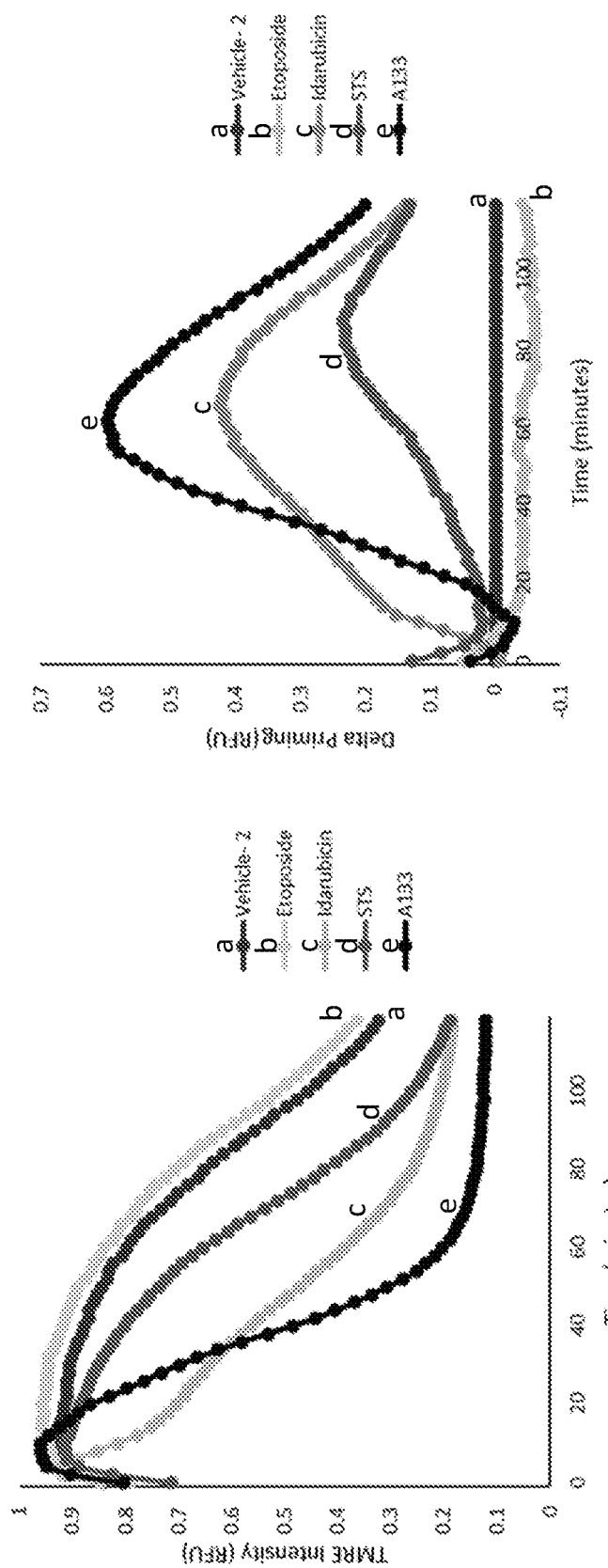
Figure 2E:
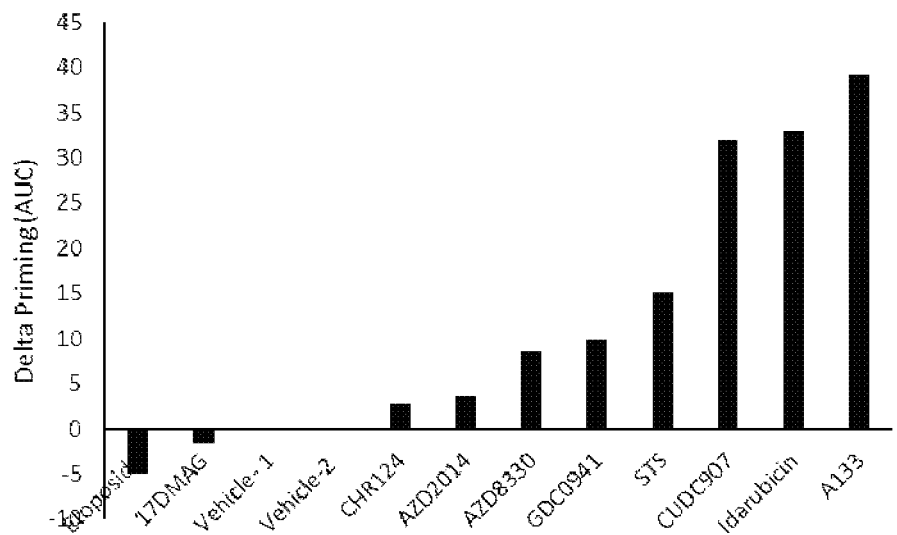
Figure 2F:
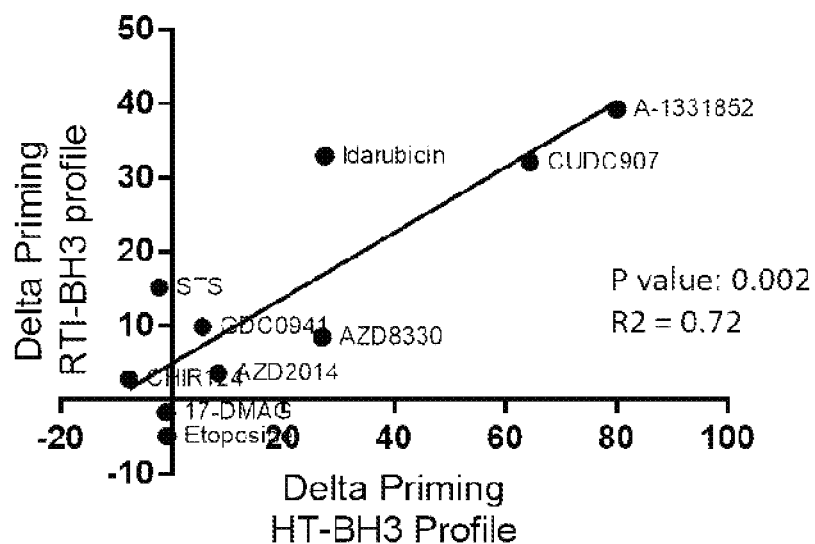

The relative drug-induced changes in Panc8902 cells were evaluated by determining delta priming for each drug at different time points (FIG. 2D). Delta priming was calculated at different time points according to the formula: $A(t)=TMRE_{DMSO}(t)-TMRE_{drug}(t)$. A summary parameter of delta priming for each drug over the course of the different time points was determined by calculating the area under the curve for the delta priming quantification of FIG. 2D. The summary parameters for different drugs tested are shown compared in FIG. 2E. The summary parameters determined by LCI-DBP were then compared to fixed cell measurements of delta priming (FIG. 2F). The correlation of the different DBP measurements was characterized by an $R^2$ value of 0.72 (p value: 0.002).

Example 3. LCI-DBP on an MMTV Breast Cancer PDX Model

LCI-DBP was carried out on an MMTV breast cancer PDX model to evaluate cell sensitivity to different drug treatments (FIGS. 3A-3G). MMTV-PyMT-T1 cells were plated in 384-well collagen-coated plates at 4,000 cells per well. Cells were treated with either DMSO (vehicle) or 17-DMAG (an Hsp90 inhibitor). Wells containing cells treated with DMSO served as undrugged control standards. After the plated cells were treated overnight, cells were stained with LCI-DBP Initial Staining Solution and then washed with LCI-DBP Wash Buffer. The cells were permeabilized with digitonin and treated with BIM BH3 peptide (10 μM final in each well) by the addition of LCI-DBP BIM Buffer (100 μM).

Figure 3A:
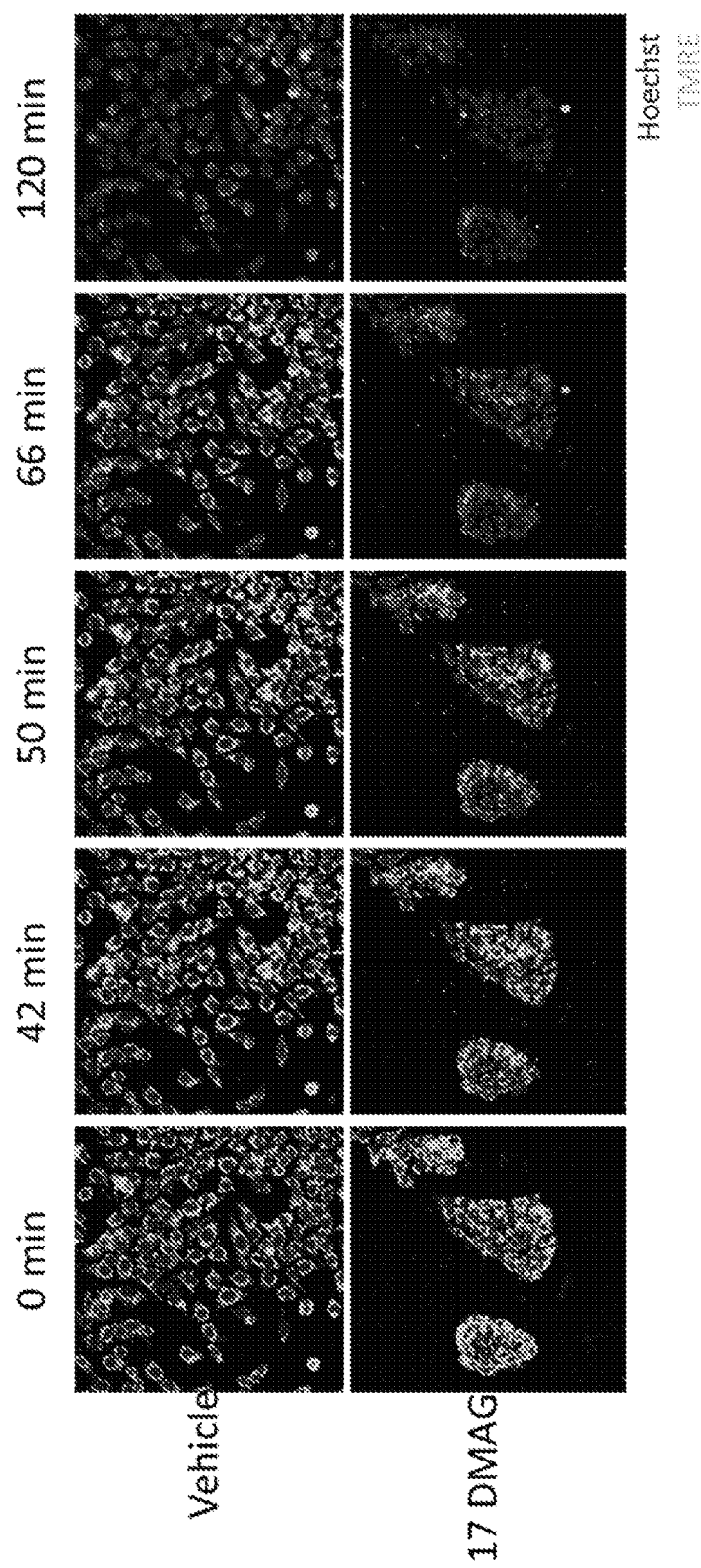
FIGS. 3A-3G show an example of LCI-DBP on an MMTV Breast Cancer PDX Model showing different sensitivities to drug treatments.

Cells were imaged by live single-cell imaging at 0 minutes, 42 minutes, 50 minutes, 66 minutes, and 120 minutes following BH3 peptide addition (FIG. 3A). Nuclear staining was detected as a blue emission from Hoechst 33342, and mitochondrial transmembrane potential staining was detected as a green emission from TMRE. As shown, drug-treated cells had an observable accelerated loss in mitochondrial potential (bottom panels) compared to undrugged cells (top panels), as detected by a loss in TMRE emission over time.

Figure 3B:
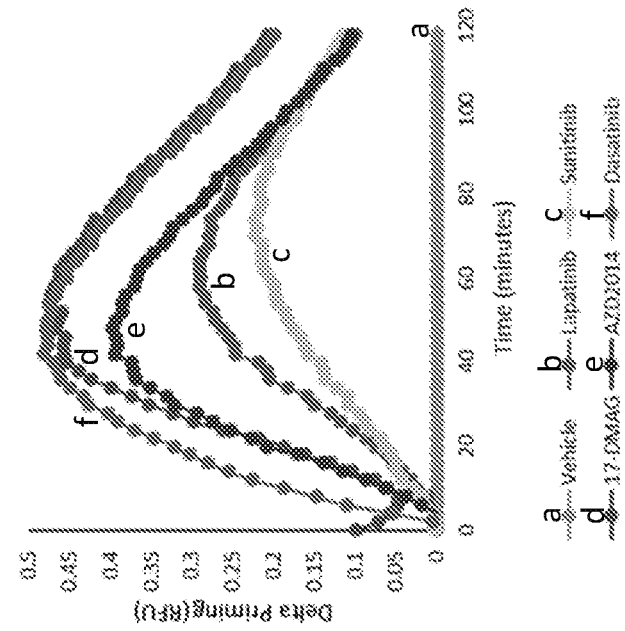

LCI-DBP was carried out as described for additional test drugs (lapatinib, sunitinib, AZD2014, and dasatinib) in MMTV-PyMT-T1 cells. The relative loss in mitochondrial potential across treatments as measured by live cell imaging is shown in FIG. 3B, which is a plot of TMRE intensity of single-cell traces averaged per drug treatment (normalized to maximum relative fluorescence units (RFU) per cell trace).

Figure 3C:
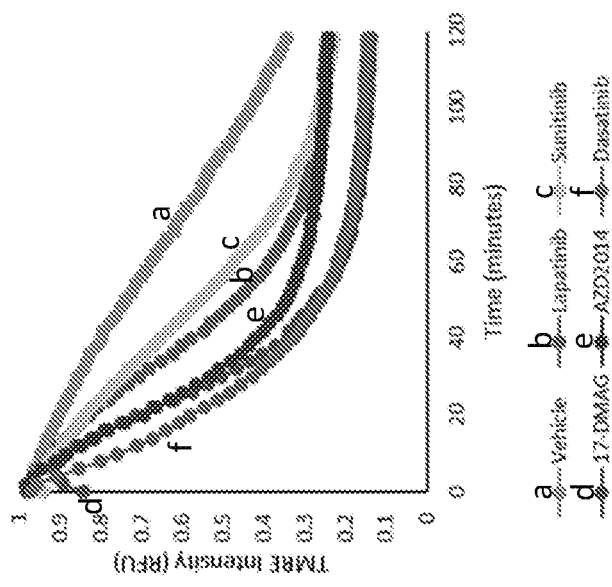
Figure 3D:
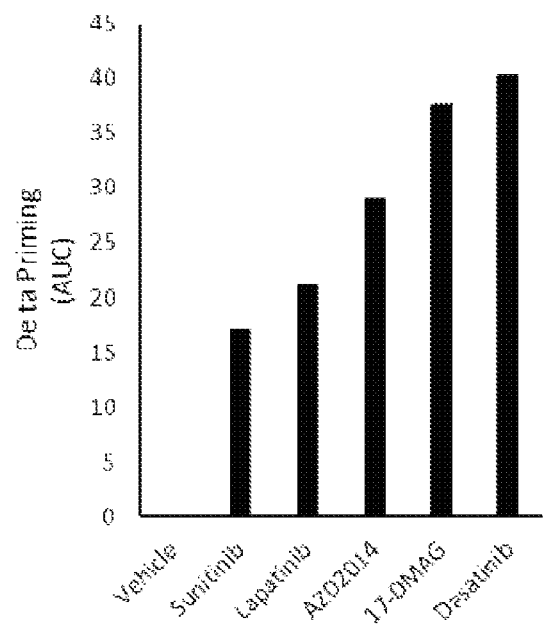

The relative drug-induced changes in MMTV-PyMT-T1 cells were evaluated by determining delta priming for each drug at different time points (FIG. 3C). Delta priming was calculated at different time points as described above. A summary parameter of delta priming for each drug over the course of the different time points was determined by calculating the area under the curve for the delta priming quantification of FIG. 3C. The summary parameters for different drugs tested are shown compared in FIG. 3D.

Figure 3E:
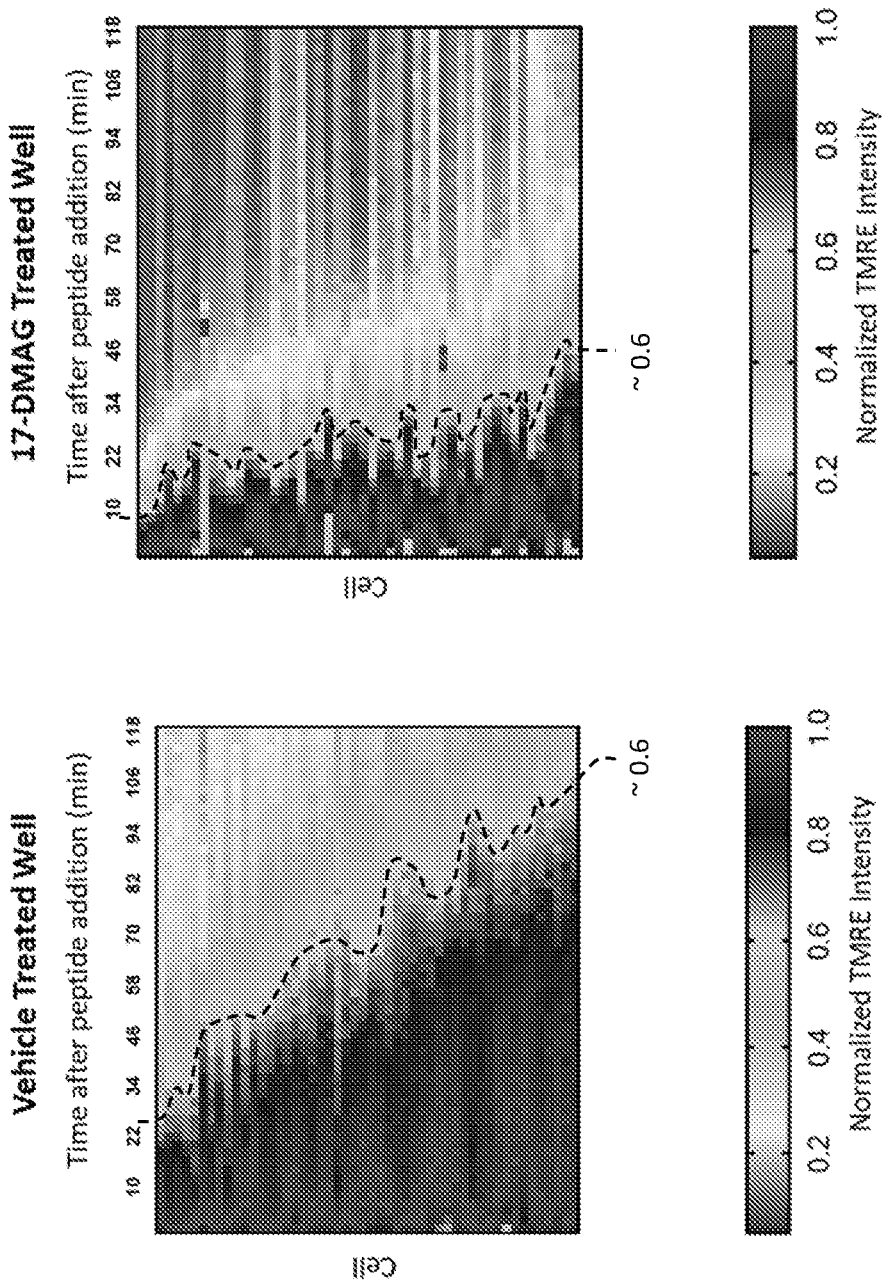

The differential loss in mitochondrial potential for drug-treated versus undrugged cells is visualized in FIG. 3E, which shows single-cell data plots of TMRE loss in MMTV-PyMT-T1 cells treated with DMSO (left plot) or treated with 17-DMAG (right plot). Each row in a plot represents a unique cell, and each column represents a single time point. A dashed line is shown as an overlay on each plot corresponding to TMRE emission intensity of approximately 0.60 (~40% loss in normalized TMRE emission intensity).

Figure 3F:
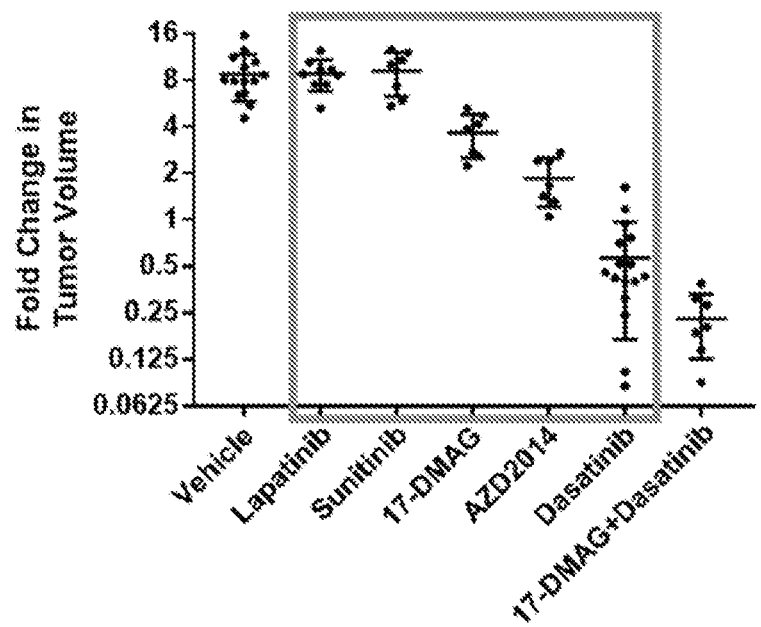
Figure 3G:
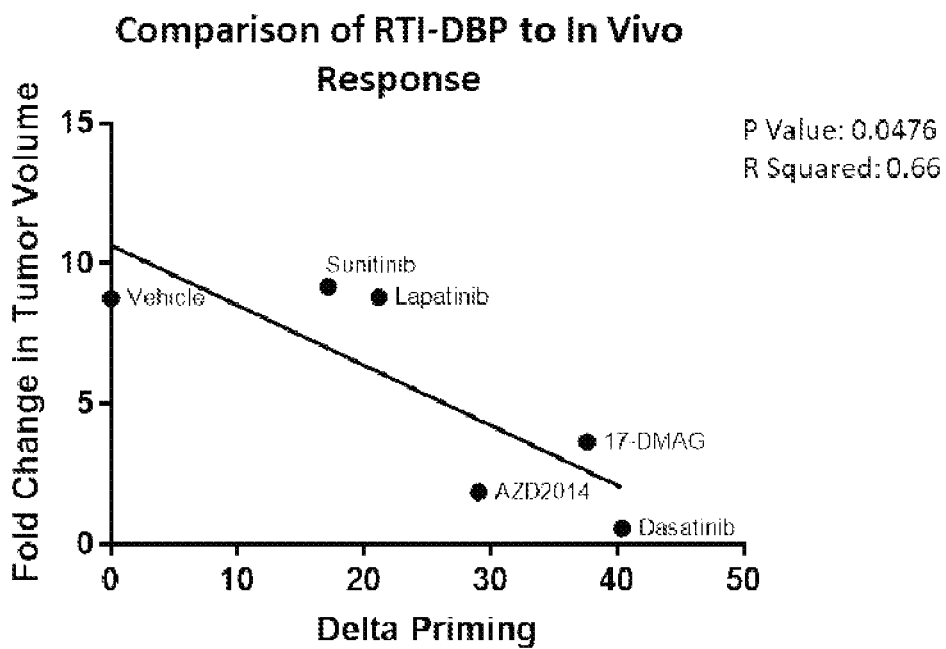

Treatment response of MMTV-PyMT-T1 cells in vivo was determined by measuring a change in tumor volume following treatment with different drugs, as shown in FIG. 3F. In addition to the monotherapies evaluated by LCI-DBP, in vivo response to combination therapy (17-DMAG and dasatinib) was determined. The measured treatment responses in vivo were then compared to the summary parameters determined by LCI-DBP (FIG. 3G). The correlation of treatment response in vivo to treatment response measured by LCI-DBP was characterized by an $R^2$ value of 0.66 (p value: 0.0476).

Example 4. BH3 Peptide Response in Core Biopsy by Live Cell Imaging

Figure 4:
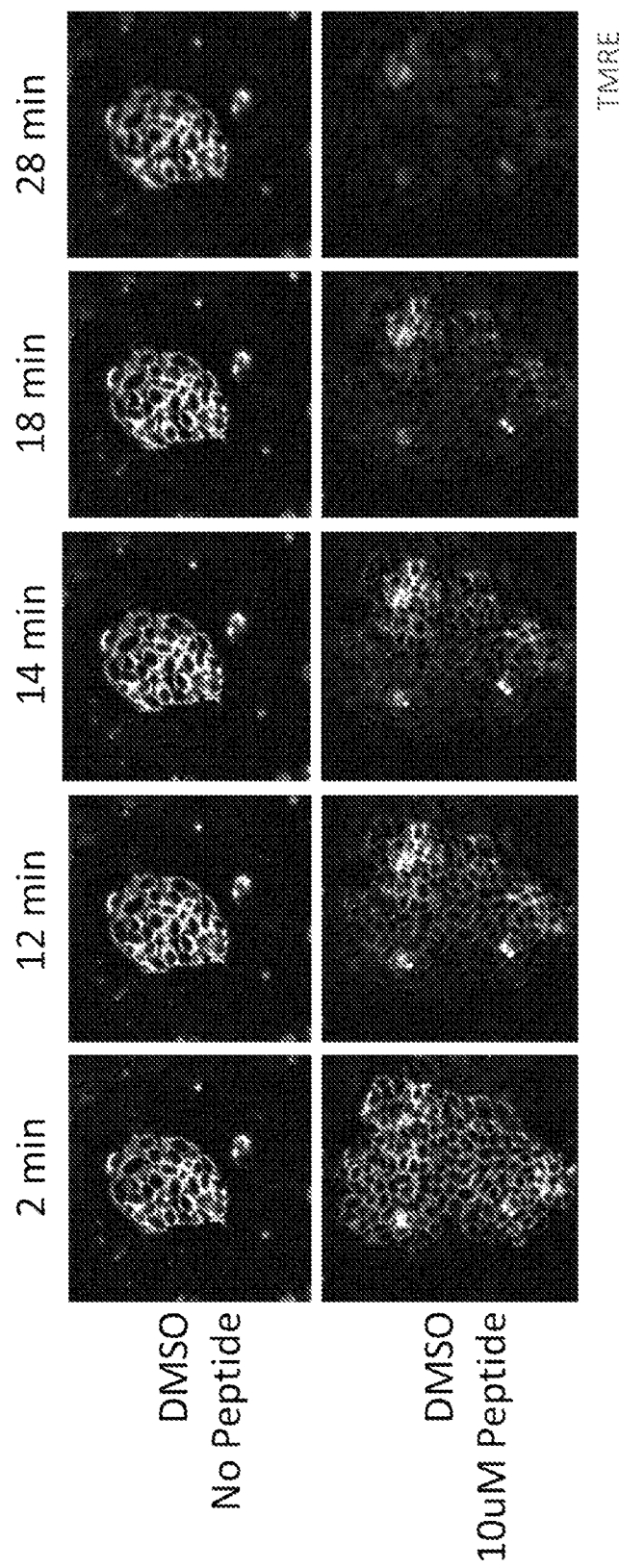
FIG. 4 shows an example of BH3 peptide-specific loss in mitochondrial potential for cells of a human colorectal core biopsy from a liver metastasis. Cells were treated with DMSO, and the treated cells were imaged at different time points using TMRE after being contacted with BH3 peptide (bottom panels) or not contacted with BH3 peptide (top panels).

The BH3 peptide-specific loss in mitochondrial potential on a human colorectal core biopsy from a liver metastasis was evaluated by live cell imaging (FIG. 4). Cells of the core biopsy sample were treated with DMSO, and the treated cells were imaged by live cell imaging in the absence (top panels) or presence (bottom panels) of 10 µM BIM BH3 peptide. Images of both peptide treatment conditions were captured at different time points following the addition of BIM BH3 peptide to the peptide-treated wells. Change in mitochondrial transmembrane potential was measured by following a decrease in TMRE emission over time. As shown, there was an observable loss in TMRE emission in peptide-treated wells as compared to wells lacking BH3 peptides.

Example 5. LCI-DBP on a Pancreatic 8902 Cell Line

Figure 5A:
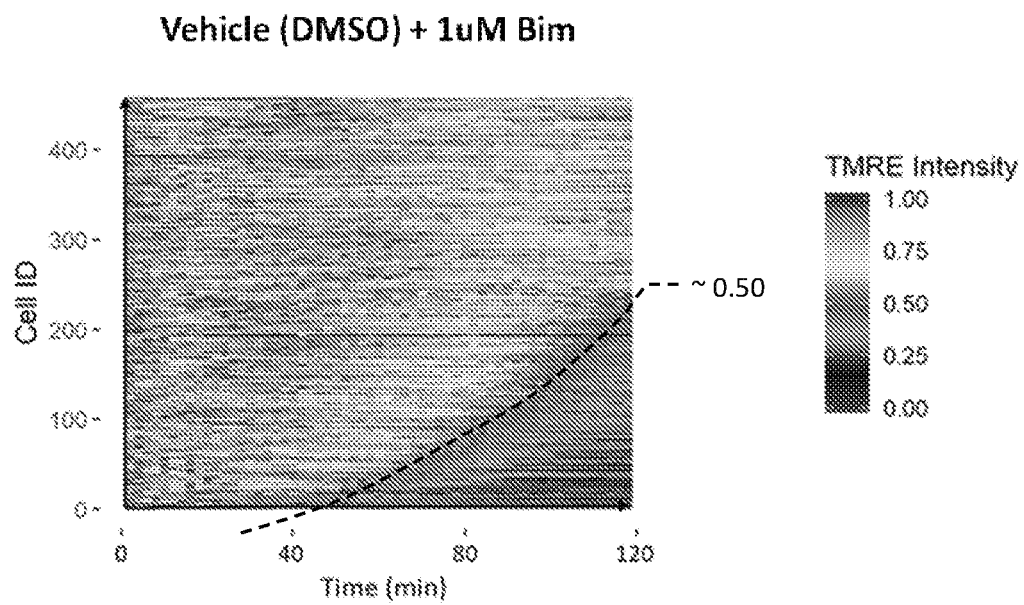
FIGS. 5A-5C show an example of LCI-DBP on a Pancreatic 8902 cell line showing sensitivity to drug treatments.
Figure 5B:
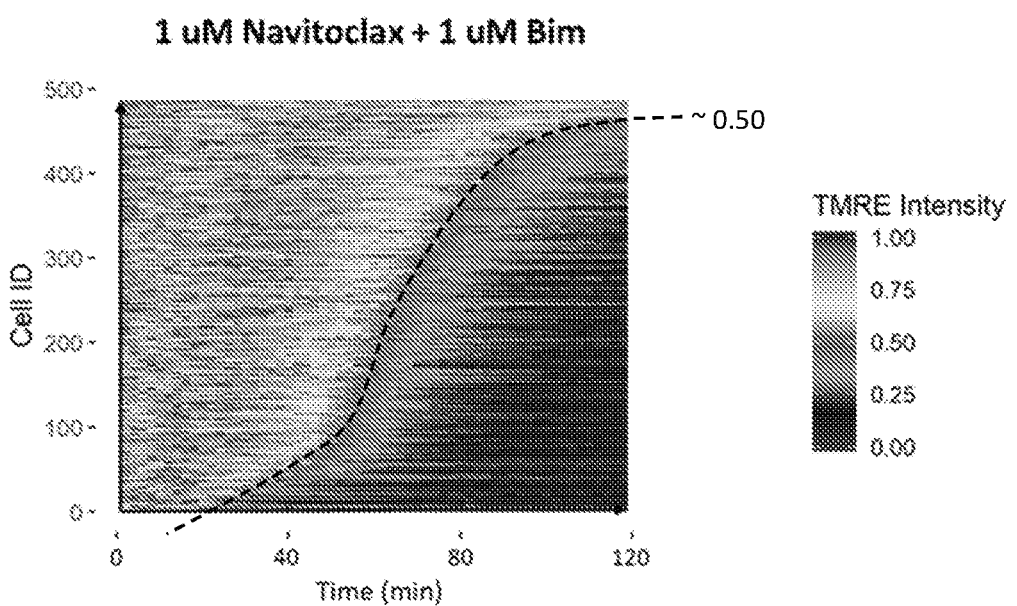
Figure 5C:
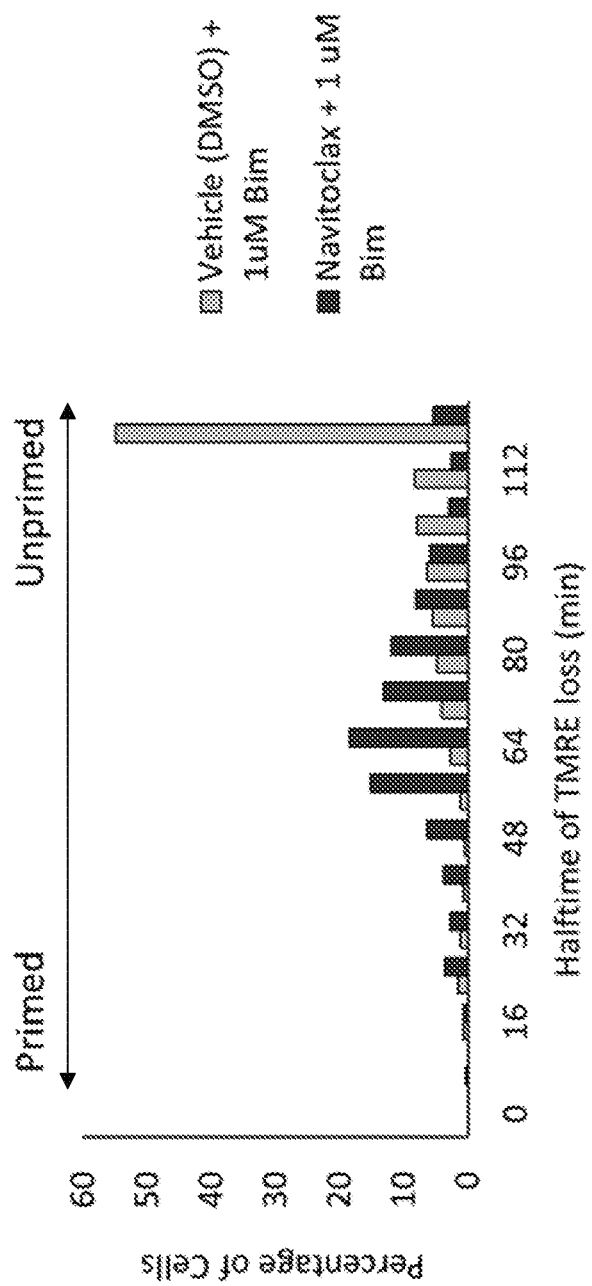

LCI-DBP was carried out on a Pancreatic 8902 (Panc8902) cell line to evaluate cell sensitivity to drug treatment (FIGS. 5A-5C). Panc8902 cells were plated in 384-well plates at 2,000 cells per well. Cells were treated with either DMSO (vehicle) or Navitoclax (a Bcl-2 and Bcl-XL inhibitor) (1 µM). Cells treated with DMSO served as undrugged control standards relative to Navitoclax drug treatment. After the plated cells were treated overnight, cells were stained with LCI-DBP Initial Staining Solution and then washed with LCI-DBP Wash Buffer. The cells were permeabilized with digitonin and treated with BIM BH3 peptide (1 µM final in each well) by the addition of LCI-DBP BIM Buffer (100 µM).

Cells were imaged by live single-cell imaging. Mitochondrial membrane potential was monitored over 120 minutes following treatment with BH3 peptide and detected as a green emission from TMRE. Single-cell data plots were generated showing TMRE loss in Panc8902 cells treated with DMSO (FIG. 5A) or treated with Navitoclax (FIG. 5B). As shown in FIGS. 5A-5B, each row in a plot represents a unique cell, and each column represents a single time point. A dashed line is shown as an overlay on each plot corresponding to TMRE emission intensity of approximately 0.50 (~50% loss in normalized TMRE emission intensity). At 120 minutes, individual cells above the dashed line had an emission intensity above 0.50, and individual cells below the dashed line had an emission intensity below 0.50.

The half-time of TMRE loss in single cells (the time at which a single cell irreversibly loses 50% of its maximum TMRE signal) was quantified as a measurement of apoptotic priming. A histogram of the single-cell results is shown in FIG. 5C. There was a decrease in the half-time of TMRE loss in Navitoclax-treated cells, indicating that the cells on average are more primed for apoptosis. The maximum half-time value shown in the histogram (120 min) corresponds to single cells with a half-time of at least 120 minutes, such that this data point includes single cells that did not decrease to 50% of maximum TMRE signal over the course of measurement.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be appreciated that embodiments described in this document using an open-ended transitional phrase (e.g., "comprising") are also contemplated, in alternative embodiments, as "consisting of" and "consisting essentially of" the feature described by the open-ended transitional phrase. For example, if the application describes "a composition comprising A and B," the application also contemplates the alternative embodiments "a composition consisting of A and B" and "a composition consisting essentially of A and B."

Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

The recitation of a listing of chemical groups in any definition of a variable herein includes definitions of that variable as any single group or combination of listed groups. The recitation of an embodiment for a variable herein includes that embodiment as any single embodiment or in combination with any other embodiments or portions thereof. The recitation of an embodiment herein includes that embodiment as any single embodiment or in combination with any other embodiments or portions thereof.

What is claimed is:

1. A method of identifying a putative therapeutic agent for treating cancer, the method comprising:
   a. providing a test cell portion of a cell population that comprises primary cancerous cells, wherein the test cell portion has been contacted with a test agent;
   b. contacting the test cell portion with a BCL-2 homology domain 3 (BH3) peptide;
   c. capturing a series of images of the test cell portion over a time interval by live cell imaging;
   d. measuring BH3 peptide-induced mitochondrial outer membrane permeabilization (MOMP) in the test cell portion at different time points in the time interval by detecting emission of a potentiometric dye; and
   e. comparing BH3 peptide-induced MOMP measured in the test cell portion to BH3 peptide-induced MOMP in a control cell portion of the cell population, wherein the control cell portion has not been contacted with the test agent;
   wherein an increase in BH3 peptide-induced MOMP in the test cell portion compared to that in the control cell portion indicates that the test agent is a putative therapeutic agent for treating cancerous cells of the cell population, and no increase in BH3 peptide-induced MOMP in the test cell portion compared to that in the control cell portion indicates that the test agent is not a putative therapeutic agent for treating cancerous cells of the cell population.

2. The method of any one of the preceding claims, further comprising:
   i) providing the control cell portion of the cell population, wherein the control cell portion has not been contacted with the test agent;
   ii) contacting the control cell portion with the BH3 peptide;
   iii) capturing a series of images of the control cell portion over the time interval by live cell imaging; and
   iv) measuring BH3 peptide-induced MOMP in the control cell portion at the different time points based on the captured images.

3. The method of any one of the preceding claims, wherein the test cell portion is contacted with the BH3 peptide at a first peptide concentration, and the method further comprises contacting the test cell portion with the BH3 peptide at a second increased peptide concentration after measuring BH3 peptide-induced MOMP at the first peptide concentration.

4. The method of claim 3, wherein (c) through (e) are performed at the second increased peptide concentration.

5. The method of claim 1, wherein the test cell portion and the control cell portion comprise a detectable marker for cancerous cells, and wherein BH3 peptide-induced MOMP is measured only in cells comprising the detectable marker.

6. The method of claim 5, wherein the detectable marker is an intracellular tumor marker, an extracellular tumor marker, or a cell surface tumor marker.

7. The method of claim 6, further comprising staining the test and control cell portions with an antibody for the detectable marker, and detecting staining for the antibody to identify cancerous cells.

8. The method of claim 1, wherein cells of the test and control cell portions are attached to a solid surface.

9. The method of claim 8, wherein the attached cells do not exceed 10,000 cells.

10. The method of claim 9, wherein the attached cells are present from at least 100 cells and up to 10,000 cells, at least 100 cells and not exceeding 1,000 cells, at least 1,000 cells, at least 1,000 cells and not exceeding 5,000 cells, or at least 5,000 cells.

11. The method of claim 1, wherein the cell population is obtained from a core biopsy sample, a primary human tumor sample, or a patient derived xenograft (PDX).

12. The method of claim 1, wherein the BH3 peptide is derived from the BH3 domain of a polypeptide selected from the group consisting of BIM (BCL-2 interacting mediator of cell death), BID (BH3 interacting domain death agonist), BAD (BCL-2-associated death promoter), Noxa A, Noxa B, PUMA (p53 up-regulated modulator of apoptosis), BMF (BCL-2-modifying factor), HRK (harakiri), and BIK (BCL-2 interacting killer).

13. The method of claim 1, wherein the BH3 peptide is a non-natural BH3 peptide selected from the group consisting of SEQ ID NO 10, SEQ ID NO 11, SEQ ID NO 12 and SEQ ID NO 16.

14. A method of identifying a putative therapeutic agent for treating cancer, the method comprising:
   a. providing a test cell portion of a cell population that comprises primary cancerous cells, wherein the test cell portion has been contacted with a test agent;
   b. contacting the test cell portion with a BCL-2 homology domain 3 (BH3 ) peptide;
   c. capturing a series of images of the test cell portion over a time interval by live cell imaging;
   d. measuring BH3 peptide-induced mitochondrial outer membrane permeabilization (MOMP) in the test cell portion at different time points in the time interval by detecting emission of a potentiometric dye; and
   e. comparing BH3 peptide-induced MOMP measured in the test cell portion to BH3 peptide-induced MOMP in a control cell portion of the cell population, wherein the control cell portion has not been contacted with the test agent;
   wherein comparing comprises determining a value for delta priming, wherein delta priming is the difference between BH3 peptide-induced MOMP in the test cell portion and BH3 peptide-induced MOMP in the control cell portion; and
   wherein an increase in BH3 peptide-induced MOMP in the test cell portion compared to that in the control cell portion indicates that the test agent is a putative therapeutic agent for treating cancerous cells of the cell population, and no increase in BH3 peptide-induced MOMP in the test cell portion compared to that in the control cell portion indicates that the test agent is not a putative therapeutic agent for treating cancerous cells of the cell population.

15. The method of claim 14, wherein the value for delta priming is determined at a plurality of the different time points.

16. The method of claim 14, wherein the value for delta priming is a peak value that corresponds to a maximum difference in MOMP occurring over the time interval.

17. The method of claim 14, wherein the value for delta priming is a peak value that corresponds to a maximum change in MOMP occurring over a portion of the time interval.

18. The method of claim 14, further comprising determining a summary value for delta priming that corresponds to overall changes in MOMP occurring over the time interval.

19. A method of identifying a putative therapeutic agent for treating cancer, the method comprising:
    a. providing a test cell portion of a cell population that comprises primary cancerous cells, wherein the test cell portion has been contacted with a test agent;
    b. contacting the test cell portion with a BCL-2 homology domain 3 (BH3) peptide and treating it with a reagent for measuring BH3 peptide-induced mitochondrial outer membrane perrneabilization (MOMP);
    c. capturing a series of images of the test cell portion over a time interval by live cell imaging;
    d. analyzing the captured images to measure BH3 peptide-induced MOMP in the test cell portion at different time points in the time interval, wherein the analysis comprises measuring an increase or decrease in emission over time by the reagent for measuring BH3 peptide-induced MOMP; and
    e. comparing BH3 peptide-induced MOMP measured in the test cell portion to BH3 peptide-induced MOMP in a control cell portion of the cell population, wherein the control cell portion has not been contacted with the test agent;
    wherein an increase in BH3 peptide-induced MOMP in the test cell portion compared to that in the control cell portion indicates that the test agent is a putative therapeutic agent for treating cancerous cells of the cell population and no increase in BH3 peptide-induced MOMP in the test cell portion compared to that in the control cell portion indicates that the test agent is not a putative therapeutic agent for treating cancerous cells of the cell population.

20. The method of claim 19, wherein comparing comprises determining a value for delta priming, wherein delta priming is the difference between BH3 peptide-induced MOMP in the test cell portion and BH3 peptide-induced MOMP in the control cell portion.

* * * * *